(12) United States Patent  
Chen

(10) Patent No.: US 10,843,826 B2  
(45) Date of Patent: Nov. 24, 2020

(54) PACKAGING SYSTEMS WITH SIZING MANDRELS AND RELATED DEVICES THAT CAN OPERATE AT REDUCED PRESSURES SUITABLE FOR LOW TEMPERATURE EXPLOSIVES EMULSIONS

(71) Applicant: Tipper Tie, Inc., Apex, NC (US)

(72) Inventor: Kuo-Raid Grant Chen, Cary, NC (US)

(73) Assignee: TIPPER TIE, INC., Apex, NC (US)

( * ) Notice: Subject to any disclaimer, the term of this patent is extended or adjusted under 35 U.S.C. 154(b) by 454 days.

(21) Appl. No.: 15/231,015

(22) Filed: Aug. 8, 2016

(65) Prior Publication Data

US 2017/0129636 A1    May 11, 2017

Related U.S. Application Data

(60) Provisional application No. 62/253,451, filed on Nov. 10, 2015.

(51) Int. Cl.
| | |
|---|---|
| *B65B 9/20* | (2012.01) |
| *B65G 51/04* | (2006.01) |
| *F42B 3/087* | (2006.01) |
| *F42B 33/02* | (2006.01) |
| *B65B 51/02* | (2006.01) |
| *B29C 53/50* | (2006.01) |
| *B65B 59/00* | (2006.01) |
| *B65B 51/04* | (2006.01) |

(52) U.S. Cl.
CPC ............... *B65B 9/20* (2013.01); *B29C 53/50* (2013.01); *B65B 9/2028* (2013.01); *B65B 51/02* (2013.01); *B65B 51/04* (2013.01); *F42B 3/087* (2013.01); *F42B 33/0271* (2013.01); *B65B 59/001* (2019.05)

(58) Field of Classification Search
CPC .... B65B 9/10; B65B 9/12; B65B 9/20; B65B 9/22; B65B 9/15; B65B 9/2028; B65B 37/06; B65B 51/02; A22C 11/0209; A22C 11/0218; B29C 53/50; F42B 3/087; F42B 33/0271
USPC ................ 53/550, 575; 452/48, 34; 493/295
See application file for complete search history.

(56) References Cited

U.S. PATENT DOCUMENTS

| | | |
|---|---|---|
| 4,821,485 A | 4/1989 | Evans et al. |
| 5,020,298 A | 6/1991 | Evans et al. |
| 5,085,036 A | 2/1992 | Evans et al. |
| 5,203,760 A | 4/1993 | Chen et al. |

(Continued)

FOREIGN PATENT DOCUMENTS

DE             3435948 A1 *  4/1986  ............. B59C 53/52

*Primary Examiner* — Stephen F. Gerrity  
(74) *Attorney, Agent, or Firm* — Christensen O'Connor Johnson Kindness PLLC

(57) ABSTRACT

Apparatus, systems, devices, methods with thin walled sizing mandrels that are capable of packaging low temperature explosives emulsions at high volumes and lower pressures. The packaging systems can include a rotating table having a vertical column comprising a plurality of circumferentially spaced apart clippers; a pump; and a tubular sizing mandrel in fluid communication with the pump. The tubular sizing mandrel has a downstream end segment that merges into a segment with a plurality of radially spaced apart, longitudinally extending flat outer surfaces, the flat surfaces can be bounded laterally (circumferentially) by chamfered edges.

15 Claims, 11 Drawing Sheets

(56) References Cited

U.S. PATENT DOCUMENTS

| | | | |
|---|---|---|---|
| 5,255,497 A * | 10/1993 | Zoromski et al. | B65B 9/22 53/551 |
| 5,259,168 A | 11/1993 | Evans et al. | |
| 5,471,815 A | 12/1995 | Evans et al. | |
| 5,644,896 A | 7/1997 | Evans et al. | |
| 6,050,888 A * | 4/2000 | Nakamura et al. | A22C 11/02 452/47 |
| 6,439,990 B1 * | 8/2002 | Kasai et al. | A22C 11/107 452/46 |
| 7,306,511 B2 * | 12/2007 | Whittlesey et al. | A22C 11/0209 452/45 |
| 7,524,240 B2 * | 4/2009 | Mueller et al. | A22C 11/0209 452/32 |
| 8,006,463 B2 | 8/2011 | May et al. | |
| 2011/0183590 A1 * | 7/2011 | Hiller | A22C 11/0209 452/45 |
| 2012/0180915 A1 | 7/2012 | Lubbe et al. | |

\* cited by examiner

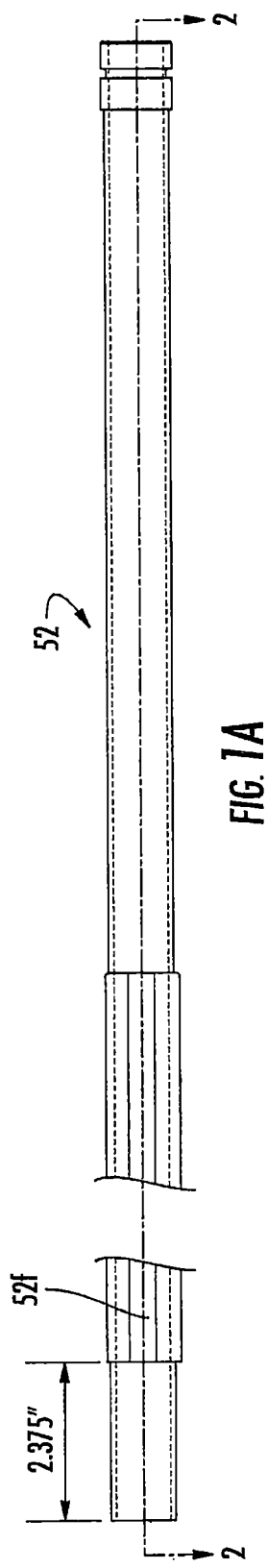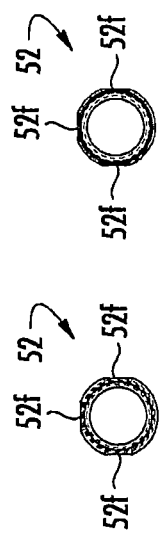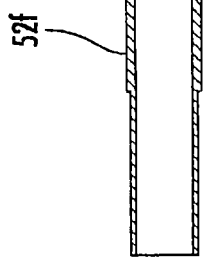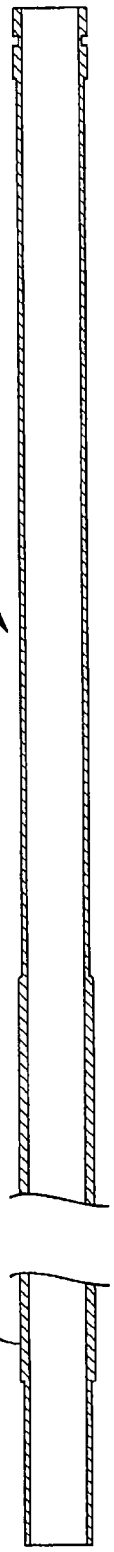
FIG. 1A (PRIOR ART)
FIG. 1B (PRIOR ART)
FIG. 1C (PRIOR ART)
FIG. 2 (PRIOR ART)

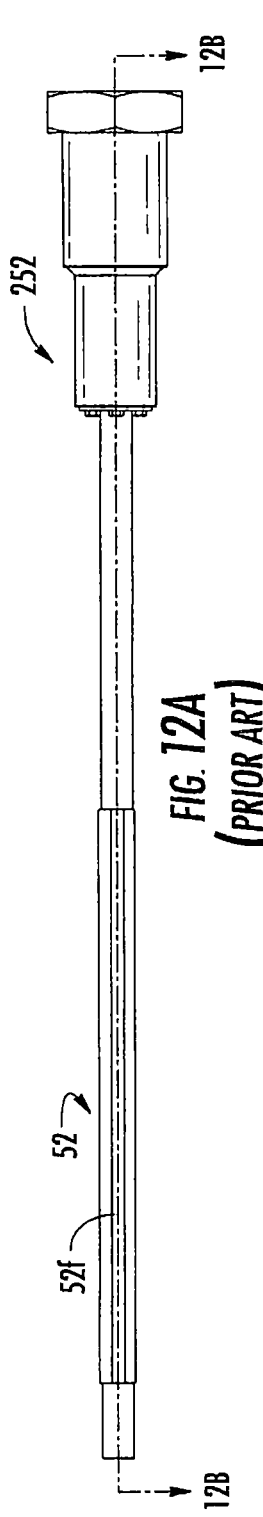
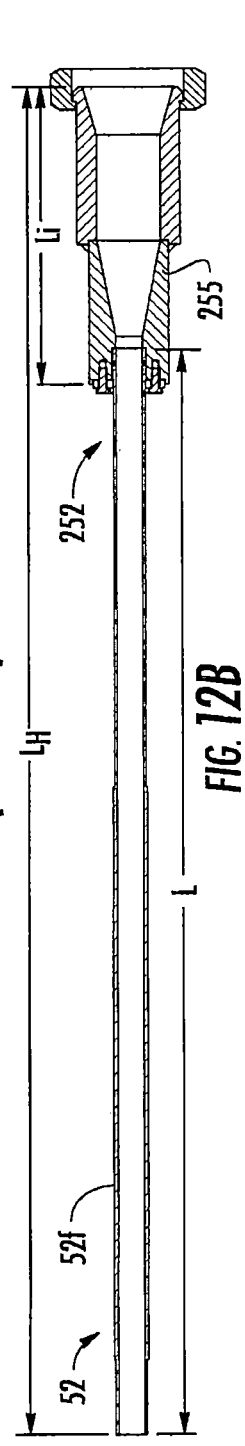
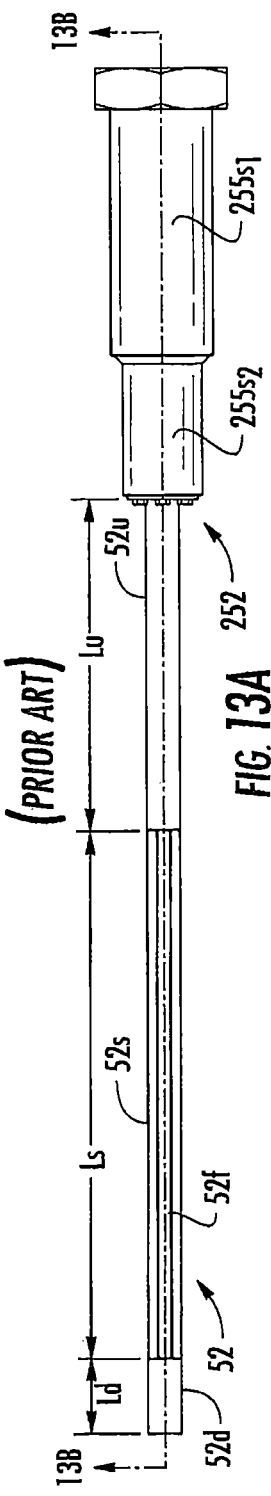
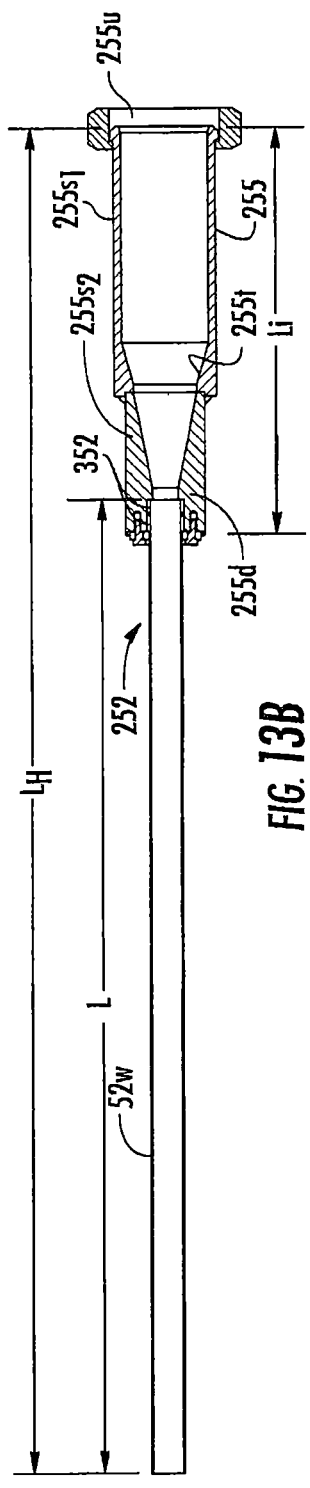
FIG. 12A (PRIOR ART)
FIG. 12B (PRIOR ART)
FIG. 13A
FIG. 13B

PIPE MARKING WALL CHART

WALL CHART - PIPE COLOR CODING STANDARDS SET BY ANSI AND ASME

NOMINAL WALL THICKNESS FOR SEAMLESS AND WELDED STEEL PIPES ACCORDING ANSI B36.10 ARE INDICATED IN THE TABLE BELOW.

| NOMINAL PIPE SIZE (IN) | OUTSIDE DIA. (IN) | SCHEDULE WALL THICKNESS (IN) | | | | | | | | | | | | |
|---|---|---|---|---|---|---|---|---|---|---|---|---|---|---|
| | | 10 | 20 | 30 | STD | 40 | 60 | XS | 80 | 100 | 120 | 140 | 160 | XXS |
| 1/6 | 0.405 | | | | 0.068 | 0.068 | | 0.095 | 0.095 | | | | | |
| 1/4 | 0.540 | | | | 0.086 | 0.088 | | 0.119 | 0.119 | | | | | |
| 3/8 | 0.675 | | | | 0.091 | 0.091 | | 0.126 | 0.126 | | | | | |
| 1/2 | 0.840 | | | | 0.109 | 0.109 | | 0.147 | 0.147 | | | | 0.187 | 0.294 |
| 3/4 | 1.050 | | | | 0.113 | 0.113 | | 0.154 | 0.154 | | | | 0.219 | 0.308 |
| 1 | 1.315 | | | | 0.133 | 0.133 | | 0.179 | 0.179 | | | | 0.250 | 0.358 |
| 1 1/4 | 1.660 | | | | 0.140 | 0.140 | | 0.191 | 0.181 | | | | 0.250 | 0.382 |
| 1 1/2 | 1.900 | | | | 0.145 | 0.145 | | 0.200 | 0.200 | | | | 0.281 | 0.400 |
| 2 | 2.375 | | | | 0.154 | 0.154 | | 0.218 | 0.218 | | | | 0.344 | 0.436 |
| 2 1/2 | 2.675 | | | | 0.203 | 0.203 | | 0.276 | 0.276 | | | | 0.375 | 0.552 |
| 3 | 3.500 | | | | 0.216 | 0.216 | | 0.300 | 0.300 | | | | 0.438 | 0.600 |
| 3 1/2 | 4.000 | | | | 0.226 | 0.226 | | 0.318 | 0.318 | | | | | |
| 4 | 4.500 | | | | 0.237 | 0.237 | | 0.337 | 0.337 | | 0.438 | | 0.531 | 0.674 |
| 5 | 5.563 | | | | 0.258 | 0.258 | | 0.375 | 0.375 | | 0.500 | | 0.625 | 0.750 |
| 6 | 6.625 | | | | 0.280 | 0.280 | | 0.432 | 0.432 | | 0.562 | | 0.719 | 0.664 |
| 8 | 8.625 | | 0.250 | 0.277 | 0.322 | 0.322 | 0.406 | 0.500 | 0.500 | 0.594 | 0.739 | 0.812 | 0.906 | 0.675 |
| 10 | 10.750 | 0.250 | 0.250 | 0.307 | 0.365 | 0.365 | 0.500 | 0.500 | 0.594 | 0.719 | 0.844 | 1.000 | 1.125 | 1.000 |
| 12 | 12.750 | 0.250 | 0.250 | 0.330 | 0.375 | 0.406 | 0.562 | 0.500 | 0.688 | 0.844 | 1.000 | 1.125 | 1.312 | 1.000 |
| 14 | 14.000 | 0.250 | 0.312 | 0.375 | 0.375 | 0.438 | 0.594 | 0.500 | 0.750 | 0.938 | 1.094 | 1.250 | 1.406 | |
| 16 | 16.000 | 0.250 | 0.312 | 0.375 | 0.375 | 0.500 | 0.658 | 0.500 | 0.844 | 1.031 | 1.219 | 1.438 | 1.594 | |
| 18 | 18.000 | 0.250 | 0.312 | 0.438 | 0.375 | 0.562 | 0.750 | 0.500 | 0.938 | 1.156 | 1.375 | 1.562 | 1.781 | |
| 20 | 20.000 | 0.250 | 0.375 | 0.500 | 0.375 | 0.594 | 0.812 | 0.500 | 1.031 | 1.281 | 1.500 | 1.750 | 1.969 | |
| 22 | 22.000 | 0.250 | 0.375 | 0.500 | 0.375 | | 0.875 | 0.500 | 1.125 | 1.375 | 1.625 | 1.875 | 2.125 | |
| 24 | 24.000 | 0.250 | 0.375 | 0.562 | 0.375 | 0.688 | 0.969 | 0.500 | 1.219 | 1.531 | 1.812 | 2.062 | 2.344 | |
| 30 | 30.000 | 0.312 | 0.500 | 0.625 | 0.375 | 0.688 | | 0.500 | | | | | | |
| 32 | 32.000 | 0.312 | 0.500 | 0.625 | 0.375 | 0.666 | | 0.500 | | | | | | |
| 34 | 34.000 | 0.312 | 0.500 | 0.625 | 0.375 | 0.750 | | 0.500 | | | | | | |
| 36 | 36.000 | 0.312 | 0.500 | 0.625 | 0.375 | 0.750 | | 0.500 | | | | | | |
| 42 | 42.000 | | 0.500 | 0.625 | 0.375 | | | | | | | | | |

H4
- STD - STANDARD
- XS - EXTRA STRONG
- XXS - DOUBLE EXTRA STRONG

FIG. 15

PACKAGING SYSTEMS WITH SIZING MANDRELS AND RELATED DEVICES THAT CAN OPERATE AT REDUCED PRESSURES SUITABLE FOR LOW TEMPERATURE EXPLOSIVES EMULSIONS

RELATED APPLICATIONS

This application claims the benefit of and priority to U.S. Provisional Application Ser. No. 62/253,451, filed Nov. 10, 2015, the contents of which are hereby incorporated by reference as if recited in full herein.

FIELD OF THE INVENTION

The present invention relates to packaging apparatus for packaging pumpable products.

BACKGROUND OF THE INVENTION

Conventionally, in the production of consumer goods such as, for example, meat or other products, the product is pumped through a product horn into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming together long edges of a thin sheet of flexible material, typically elastomeric and/or polymeric material via an adhesive. U.S. Pat. Nos. 5,085,036 and 5,203,760 describe examples of automated substantially continuous-feed devices suitable for forming sheet material or flat roll stock into tubular film casings. The contents of the above referenced patents are hereby incorporated by reference as if recited in full herein.

Rotating multi-clipper platform packaging systems, such as Rota-Clip® high speed packaging systems by Tipper Tie, Apex, N.C., have been used with heat-seal devices to produce a series of chubs or clipped packages of product. See, e.g., U.S. Pat. Nos. 4,821,485; 5,020,298; 5,259,168; 5,471,815; 5,644,896 and 8,006,463. The contents of the above referenced patents are hereby incorporated by reference as if recited in full herein.

The multi-clipper platform packaging systems have been used to package many different and diverse pumpable emulsions such as food and explosives. For some products, packaging speed can be limited by pressure in a tubular product horn known as a "sizing mandrel" that has the smallest diameter that the pumpable product is pumped through and which controls/influences the size of the sealed diameter of the tubular film/casing to provide a consistent finished product diameter. An example of a conventional sizing mandrel 52 is shown in FIGS. 1A-1C and 2. The pressure in the packaging system can be particularly challenging for higher volume/speed operations when pumping low temperature explosive emulsions which can double the pressure generated compared to when pumping hot emulsions (e.g., above 250 parts per minute), particularly when producing relatively small products or "chubs" such as products having about a 25 mm to 35 mm diameter.

As shown in FIGS. 1A-1C and 2, the sizing mandrel 52 can have a segment with increased wall thickness relative to adjacent segments that provides three circumferentially spaced apart flat outer surfaces 52f that extend a longitudinal length. As is well known to those of skill in the art, two of these opposing flat surfaces 52f can cooperate with a respective drive belt, such as a vacuum belt, for pulling the casing/film along the product sizing mandrel 52. The other flat surface 52f can cooperate with a roller that can press against a seal after adhesive is applied.

SUMMARY OF EMBODIMENTS OF THE INVENTION

Embodiments of the invention provide a sizing mandrel suitable for packaging pumpable product such as low and/or middle temperature emulsions of explosives.

The packaging systems using the sizing mandrel can allow for a low temperature explosives emulsion to be pumped at a rates sufficient to generate above 250 parts per minute ("ppm") of packaged emulsion products, typically at or above 275 ppm, at a maximum operating pressure of 11 bars or less.

The packaging systems can package emulsions of explosive material held at a temperature that is about 65 degrees Celsius ("degrees C") or less, typically between 50-65 degrees C., such as, for example between about 50-55 degrees C., inclusive thereof.

The packaging systems can operate to package over 250 ppm, typically at or over 275 ppm and/or at 3 ton/hour or greater, for between a 200 gram-300 gram unitized packaged tubular products at a maximum pressure of 11 bars, typically at a maximum pressure of 8 or less bars. The packaging system pressure measurement can be measured at or proximate a pump outlet, typically between the pump outlet and the sizing mandrel and/or horn assembly.

The packaging system can have a horn assembly end member that attaches to a pipe segment and that is longer than conventional horn assembly end members to reduce a length of the horn or sizing mandrel as a smallest inner diameter component and provides an enlarged diameter for a longer distance with minimal pressure head loss.

In some embodiments, the sizing mandrel is part of a packaging system with a rotating table holding a plurality of circumferentially spaced apart clippers.

The sizing mandrel can have an increased inner diameter, thinner wall and shorter length compared to a corresponding conventional sizing mandrel used to produce a finished product diameter of like size.

The sizing mandrel can be a modified commercially available standard pipe per a standard pipe schedule for pressurized operation (e.g., ASTM/ANSI/ASME pipe schedule).

The sizing mandrel can have a constant wall thickness over a length associated with external flat surfaces and adjacent upstream and downstream portions.

The packaging systems can include an adhesive heat-seal module with an extruder in communication with a hopper of bulk adhesive and an adhesive flow path supplying heated adhesive to an adhesive dispensing dispenser that dispenses the heated adhesive to film formed into a tubular shape using a forming collar residing upstream of the adhesive dispenser and sizing mandrel.

The packaging systems can employ a forming module to form flat roll-stock, such as film, into tubular casings.

The heat-sealing can be carried out using hot-melt adhesive applied to the seam at a temperature between 200 degrees C. and 300 degrees C., more typically between 200 degrees C. and 250 degrees C.

The sizing mandrel can reside between film drive belts.

The packaging systems or machines can include an automated film lifter that can extend and retract to lift film residing adjacent and upstream of the dispenser.

Some embodiments are directed to packaging systems that include a rotating table having a vertical column with a plurality of circumferentially spaced apart clippers, a pump, and a tubular sizing mandrel in fluid communication with the pump. The tubular sizing mandrel has a first most downstream end segment that merges into a second segment with between 4-12 circumferentially spaced apart, longitudinally extending flat outer surfaces.

The plurality of flat outer surfaces can be between six to twelve and adjacent flat surfaces can meet at a vertex.

The plurality of flat outer surfaces can be eight.

At least some neighboring flat outer surfaces can meet at a shared vertex and/or chamfered edge.

At least some of the flat outer surfaces have a width of between 0.3 inches and 0.5 inches and a length of between 19-21 inches.

The flat surfaces can have a length that is between 19-21 inches.

The downstream end segment of the sizing mandrel can have wall with a constant outer diameter that is devoid of or has a lesser number of the flat spaces than the second segment and can have a length that is between 2-2.375 inches.

The sizing mandrel can have a constant wall thickness over a length associated with the external flat surfaces as well as adjacent upstream and downstream portions.

The sizing mandrel can have an inner diameter over its length of between 0.90 inch and 1.1 inch.

The sizing mandrel can have a constant inner diameter of 0.957 or 1.049 inches.

The sizing mandrel can be attached to a horn assembly end member of a horn assembly, the horn assembly end member comprising a first tubular segment that merges into a smaller second tubular segment, both can have larger outer diameters than the sizing mandrel. The horn assembly end member can include an interior flow channel that is in fluid communication with the sizing mandrel. The horn assembly end member can attach to a pipe segment that resides upstream of the horn assembly, which can, in turn, be attached to the stuffer, directly or indirectly. The pipe segment can have an outer diameter of between 3 inches to 4 inches.

The first segment can have a constant inner diameter for a first length and tapers to a smaller diameter adjacent the second segment. The second segment can reduce in size, typically taper inward, to an inner diameter corresponding to an inner diameter of the sizing mandrel.

The system can include a pressure gauge extending between the pump and the horn assembly. The system can be configured to operate at under 11 bars, as measured by the pressure gauge, while producing over 250 parts per minute of clipped packages of explosive emulsion.

The packaging system can include a source of explosives emulsion provided to the stuffer at a temperature between 50 degrees C. and 65 degrees C.

The sizing mandrel has an upstream portion that can have an end that has a collar interface, the collar interface can have first and second collar members separated by a recess or groove that is sized and configured to attach to an interior of a downstream end portion of the horn assembly end member of the horn assembly.

The system can be configured to interchangeably, serially attach different horn assemblies with different size rated sizing mandrels configured to produce different diameter size end products.

The different horn assemblies include sizing mandrels rated to produce at least two of the following outer diameter chubs: 25 mm, 27 mm, 29 mm, 32 mm and 35 mm.

The packaging system can include an adhesive heat-seal module with an extruder in communication with a hopper of bulk adhesive and an adhesive flow path supplying heated adhesive to an adhesive dispenser that dispenses the heated adhesive to casing formed into a tubular shape using a forming collar residing upstream of the adhesive dispenser about the sizing mandrel.

The packaging system can include a bracket attached to a frame of the packaging system, the bracket holding a roller assembly comprising a roller.

Some aspects of the invention are directed to a horn assembly suitable for a packaging system for low and/or mid temperature explosives emulsion. The horn assembly can include a tubular sizing mandrel having a downstream end segment that merges into a segment with 5-10 circumferentially spaced apart, longitudinally extending flat outer surfaces, the flat surfaces bounded laterally by vertices; and a horn assembly end member attachable or attached to an end portion of the tubular sizing mandrel.

The flat surfaces can be eight flat outer surfaces, optionally with at least some adjacent flat surfaces sharing a longitudinally extending vertex and/or chamfered edge.

At least some of the flat outer surfaces can have a width of between 0.3 inches and 0.5 inches and can have a length of between 19-21 inches.

The segment of the sizing mandrel with the flat surfaces can have a length that is between 19-21 inches. The downstream end segment can have a shorter length, typically a length that is between 2-2.5 inches, more typically about 2.375 inches, and can have a smooth constant outer diameter devoid of flat surfaces and chamfered edges.

The sizing mandrel can have a constant wall thickness over a length associated with the flat outer surfaces as well as adjacent upstream and downstream portions thereof.

The sizing mandrel can have an inner diameter over its length of between 0.90 inch and 1.10 inch. The flat surfaces can be 8 circumferentially spaced apart, longitudinally extending flat outer surfaces.

The horn assembly end member can include a first tubular segment that merges into a smaller second tubular segment, both having larger outer diameters than the sizing mandrel. The horn assembly end member can include an interior flow channel that is in fluid communication with the sizing mandrel. The horn assembly end member can be configured to attach to a pipe segment that resides upstream of the horn assembly with an outer diameter of between 3 inches to 4 inches.

Other aspects of the invention are directed to packaging systems that include a rotating table having a vertical column comprising a plurality of circumferentially spaced apart clippers; a pump; and a tubular sizing mandrel in fluid communication with the pump, the tubular sizing mandrel having a first most downstream end segment that merges into a second segment with a plurality of circumferentially spaced apart, longitudinally extending flat outer surfaces, the flat surfaces bounded laterally by vertices.

The plurality of flat outer surfaces can be between four to twelve.

The plurality of flat outer surfaces can be eight.

At least some neighboring flat outer surfaces can meet at a shared vertex.

A packaging system, wherein at least some of the flat outer surfaces have a width of between 0.3 inches and 0.5 inches and a length of between 19-21 inches.

The flat surfaces can have a length that is between 19-21 inches. The downstream end segment of the sizing mandrel can have wall with a constant outer diameter that is devoid of or has a lesser number of the flat spaces than the second segment and has a length that is between 2- 2.375 inches.

The sizing mandrel can have a constant wall thickness over a length associated with the external flat surfaces as well as adjacent upstream and downstream portions.

The sizing mandrel can have an inner diameter over its length of between 0.90 inch and 1.1 inch.

The sizing mandrel can have a constant inner diameter of 0.957 or 1.049 inches.

The sizing mandrel can be attached to a horn assembly end member of a horn assembly, the horn assembly end member comprising a first tubular segment that merges into a smaller second tubular segment, both having larger outer diameters than the sizing mandrel, wherein the horn assembly end member comprises an interior flow channel that is in fluid communication with the sizing mandrel. The horn assembly end member can attach to a pipe segment that resides upstream of the horn assembly and is attached to the stuffer, directly or indirectly, the pipe segment can have an outer diameter of between 3 inches to 4 inches.

The first segment has a constant inner diameter for a first length and tapers to a smaller diameter adjacent the second segment. The second segment can taper inward to an inner diameter corresponding to an inner diameter of the sizing mandrel.

The packaging system can have a pressure gauge extending between the pump and the horn assembly, and the system can be configured to operate at under 11 bars, as measured by the pressure gauge, while producing over 250 parts per minute of clipped packages of explosive emulsion.

The system can include a source of explosives emulsion provided to the stuffer at a temperature between 50 degrees C. and 65 degrees C.

The sizing mandrel can have an upstream portion with an end that has a collar interface, the collar interface having first and second collar members separated by a recess or groove that is sized and configured to attach to an interior of a downstream end portion of the horn assembly end member of the horn assembly.

The system can be configured to interchangeably, serially attach different horn assemblies with different size rated sizing mandrels configured to produce different diameter size end products.

The different horn assemblies can include sizing mandrels rated to produce at least two of the following outer diameter chubs: 25 mm, 27 mm, 29 mm, 32 mm and 35 mm.

The packaging system can include an adhesive heat-seal module with an extruder in communication with a hopper of bulk adhesive and an adhesive flow path supplying heated adhesive to an adhesive dispenser that dispenses the heated adhesive to casing formed into a tubular shape using a forming collar residing upstream of the adhesive dispenser about the sizing mandrel.

Some embodiments are directed to methods of packaging explosives emulsion. The methods include: (a) providing a packaging system with a rotating table holding a plurality of circumferentially spaced apart clippers in communication with a horn assembly comprising a sizing mandrel; (b) pumping explosives emulsion at a low temperature into the sizing mandrel while having a maximum operating pressure of 11 bars; (c) encasing the pumped emulsion in tubular film; then directing the encased pumped emulsion under the rotating table to be aligned with respective clippers; then (d) applying clips from the clippers to the encased pumped emulsion to form packages of the encased pumped emulsion; and (e) producing greater than 200 ppm (typically between 250 and 350 clipped tubular packages of the encased pumped emulsion per minute).

The sizing mandrel can have a segment adjacent a most downstream end segment that terminates before the most downstream end segment and that has 4-8 circumferentially spaced apart, longitudinally extending flat outer surfaces, and wherein the encasing comprises pressing a roller against one of the flat surfaces against overlapping long edges of the film to form sealed tubular shapes with the tubular shape residing about the sizing mandrel.

The maximum operating pressure can be under 11 bars, measured between the sizing mandrel and a stuffer/pump module.

The explosives emulsion can be introduced into one or more of the stuffer, sizing mandrel or pipe between the stuffer/mandrel at a temperature between 50-65 degrees C.

The explosives emulsion can include ammonium nitrate

The clipped packages can be small diameter chubs and the pumping can pump between 3.5 tons/hour to 4.5 ton/hour.

The clipped packages can be small diameter chubs in a range of about 200 grams to about 300 grams.

The segment of the sizing mandrel with the flat surfaces can have a length that is between 19-21 inches. The downstream end segment can have a length that is between 2-2.5 inches, typically about 2.375 inches, and can have a smooth outer diameter devoid of flat surfaces and chamfered edges.

The sizing mandrel can have a constant wall thickness over a length associated with the flat outer surfaces as well as adjacent upstream and downstream portions thereof.

Adjacent flat surfaces can be laterally and longitudinally bounded by a shared vertex.

Although described above with respect to method aspects of embodiments of the present invention, it will be understood that these features may also be embodied as systems, sub-systems, modules and/or computer program products. It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 1A is a side view of an exemplary prior art sizing mandrel.

FIGS. 1B and 1C are opposing end views thereof

FIG. 2 is a section view of the prior art sizing mandrel taken along line 2-2 in FIG. 1A.

FIG. 12A is a side view of the prior art horn assembly shown in FIG. 10.

FIG. 12B is a section view taken along line 12B-12B in FIG. 12A.

FIG. 13A is a side view of the horn assembly shown in FIG. 11A according to embodiments of the present invention.

FIG. 13B is a section view taken along line 13B-13B in FIG. 13A.

FIG. 15 is a table showing a Pipe Chart that lists the nominal wall thickness for seamless and welded steel pipes according to ANSI B36.10.

DETAILED DESCRIPTION OF EMBODIMENTS OF THE INVENTION

Figure 3:
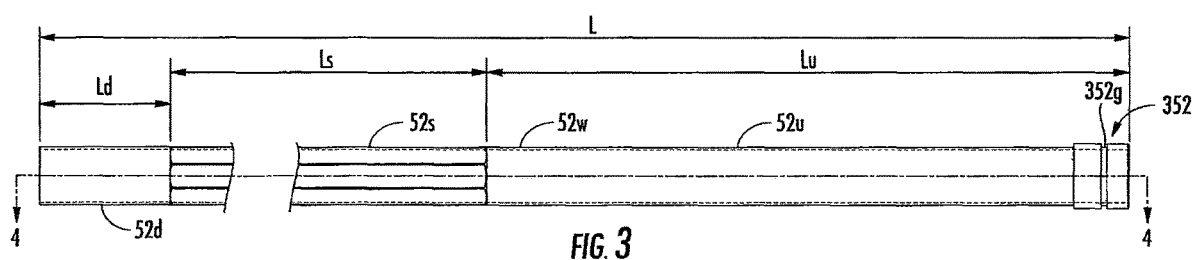
FIG. 3 is a side view of an exemplary sizing mandrel according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. The terms "FIG." and "Fig." are used interchangeably with the word "Figure" in the application and/or drawings. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame can be a floor supported frame.

The term "automated" means that operations can be carried out substantially without manual assistance, typically using programmatically directed control systems and electrical and/or mechanical devices. The term semi-automatic means that operator input or assistance may be used but that most operations are carried out automatically using electromechanical devices and programmatically directed control systems.

The term "about" means that the numerical value can vary by +/−20%. When numerical ranges are stated to be "between" the value includes the noted values, e.g., between 1-2 inches includes both 1 inch and 2 inches.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The terms "adhesive" or "glue" means a material that, when applied to a seam and/or at least one surface of overlying edge portions of a covering or casing material, can seal together to form a tubular shape to encase a target product. The seal is typically strong and is able to withstand desired pressures. For food products, the adhesive can be food grade, e.g., biocompatible. Examples of suitable adhesives include, but are not limited to, polymers such as melted HDPE (high density polyethylene).

Embodiments of the present invention are particularly suitable for packaging systems with a rotating table supporting clippers to apply clips to seal products held in the sealed tubular casings. The product may be a linked chain of elongated extruded product held in a casing. The casing or covering can be any suitable material or materials (edible or inedible, natural or synthetic) such as, but not limited to, collagen, cellulose, elastomeric, polymeric and/or plastic casing. The term "film" refers to a thin flexible sheet of covering material. The film can comprise foil or a foil laminate. When used with food products, the film, casing or covering should be food-compatible.

Referring now to the figures, FIGS. 3, 4, 5A, 5B and 6 illustrate an exemplary sizing mandrel 52 with a wall 52w according to embodiments of the invention. The sizing mandrel 52 can have an overall length "L" that is between 20-34 inches, typically between 25-31 inches, and more typically between 29-31 inches. The length L can be less than a corresponding conventional sizing mandrel for the same diameter size end/finished product. The sizing mandrel 52 can have a constant inner diameter. The sizing mandrel 52 can be provided in different sizes to form different diameter chubs or finished/packaged products from small, large and extra large sizes. Further, for small diameter chubs (25-35 mm outer diameter) the sizing mandrel 52 can be provided as a 25 mm, 27 mm, 29 mm, 32 mm or a 35 mm sizing mandrel. This size refers to the end product or chub and the sizing mandrel 52 itself for that end product size has a smaller outer diameter than the corresponding finished product or chub made using that sizing mandrel.

As is well known, during production, the chubs can vary in diameter a defined amount. For small chubs of the emulsion (25 mm-35 mm in diameter), the tolerance is typically +/−1.5 mm, more typically +/−1 mm. For large chubs having outer diameters between 40 mm to 90 mm, the tolerance is typically +/−2.5 mm, more typically +/−2 mm. For extra-large chubs having diameters between 100 mm to 150 mm, the tolerance can vary by +/−3.5 mm, typically by +/−3 mm. Thus, for example, the terms "32 mm finished end product" and "32 mm chub" are used interchangeably and refer to a packaged elongate product (of a product such as explosives emulsion) having a finished outer diameter that is between 30.5 mm and 33.5 mm, more typically 31 mm and 33 mm.

A horn assembly 252 can have an overall length (length of the sizing mandrel 52 and the horn assembly end member 255 horn length) that is the same within a small size chub group, i.e., for the 25 mm-35 mm outer diameter chubs. However, the inner diameter of the sizing mandrel and other dimensions may vary from sizing mandrel to sizing mandrel. Each horn assembly 252 (FIG. 6) can serially, releasably attached to the packaging system 10 to produce a desired size end product or chub.

For a 29 mm diameter sizing mandrel 52 with collar for producing the 32 mm diameter finished product, the wall 52w can have an inner diameter that is greater than 0.90 inches, typically between 0.90 inches and 1.0 inch, such as 0.957 inches, in some embodiments. Thus, the inner diameter can be larger than a conventional 29 mm sizing mandrel.

The sizing mandrel 52 can have a maximal outer diameter, downstream of the horn assembly interface 352, that is greater than 1 inch and less than or equal to 1.25 inches or about 1.25 inches. In some embodiments, for a 29 mm diameter collar/sizing mandrel 52 used for a 32 mm diameter end product, the wall 52w can have an outer diameter that is greater than 1 inch and equal to or less than 1.25 inches, such as 1 inch, 1.1 inches, 1.15 inches, and 1.25 inches. In some particular embodiments, the wall 52w can have a maximal and/or minimal outer diameter thickness that is in a range of 1.055 and 1.045 inches (such as about 0.027 m).

The wall 52w can be thin, typically between 0.0950 inches and 0.100 inches, such as 0.0955 inches and 0.0960 inches, which may have some minor variation +/−according to manufacturing tolerances accepted by industry and/or ASTM standards as will be well known to those of skill in the art. The sizing mandrel 52 can have an inner diameter that meets ASTM schedule standard schedule pipe, e.g., the inner diameter has a nominal size over the length of the segment 52s and typically over the downstream end 52d and the upstream portion 52u.

Generally stated, pipe size can be specified by two designations: a nominal pipe size (NPS) for diameter based on inches, and a schedule (Sched. or Sch.) for wall thickness. The European (ISO) designation equivalent to NPS is DN (diametre nominal/nominal diameter/Durchmesser nach Norm), in which sizes are measured in millimeters. The term NB (nominal bore) is also frequently used interchangeably with NPS. Standard pipe schedule or pipes sizes are given by ANSI/ASME B36.10M and API 5L. Data is based on the NPS Tables given by ANSI B36.10M and includes pipe wall thickness, outside diameter, nominal diameter. ASTM along with ASME/ANSI (B36.10. shown in FIG. 15) specifies pipe wall thickness in standard (schedule #40) and schedule pipe size. ANSI emphasizes sizes and ASTM focuses on material and application. For example, ASTM International Volume 01.01 January 2002, Steel-Piping, Tubing, Fittings provides standards for various types of piping. A53/A53M-01 provides standard specifications for pipe. ASTM A53-B provides standard specification for Schedule 40 and 80 pipe for pressure vessels. The contents of these documents are incorporated by reference as if recited in full herein.

In some embodiments, the sizing mandrel 52 can be formed from 1 inch Schedule 40, Schedule 80 or Schedule 160 and may be E.H. or Double E.H. 300 series SST pipe. "E.H." refers to "Extra Heavy" as is known to those of skill in the art. The sizing mandrel 52 can have an external polished surface with a surface finish of 125 RMS. A chart of pipe schedules for nominal pipe sizes (including 1 inch and 1.315 OD) for 40/80/160 is shown above.

The sizing mandrel 52 for a 35 mm product may have a larger outer diameter and/or inner diameter than the sizing mandrel 52 for a 32 mm product. It can be sized by selecting a schedule pipe inner diameter from the pipe schedule chart with the inner diameter as large as possible while having an outer diameter (at least upstream of the flats at 52u) that is 1.25 inches or less which can provide a suitable wall thickness after machining in the outer flat surfaces 52f.

Figure 11A:
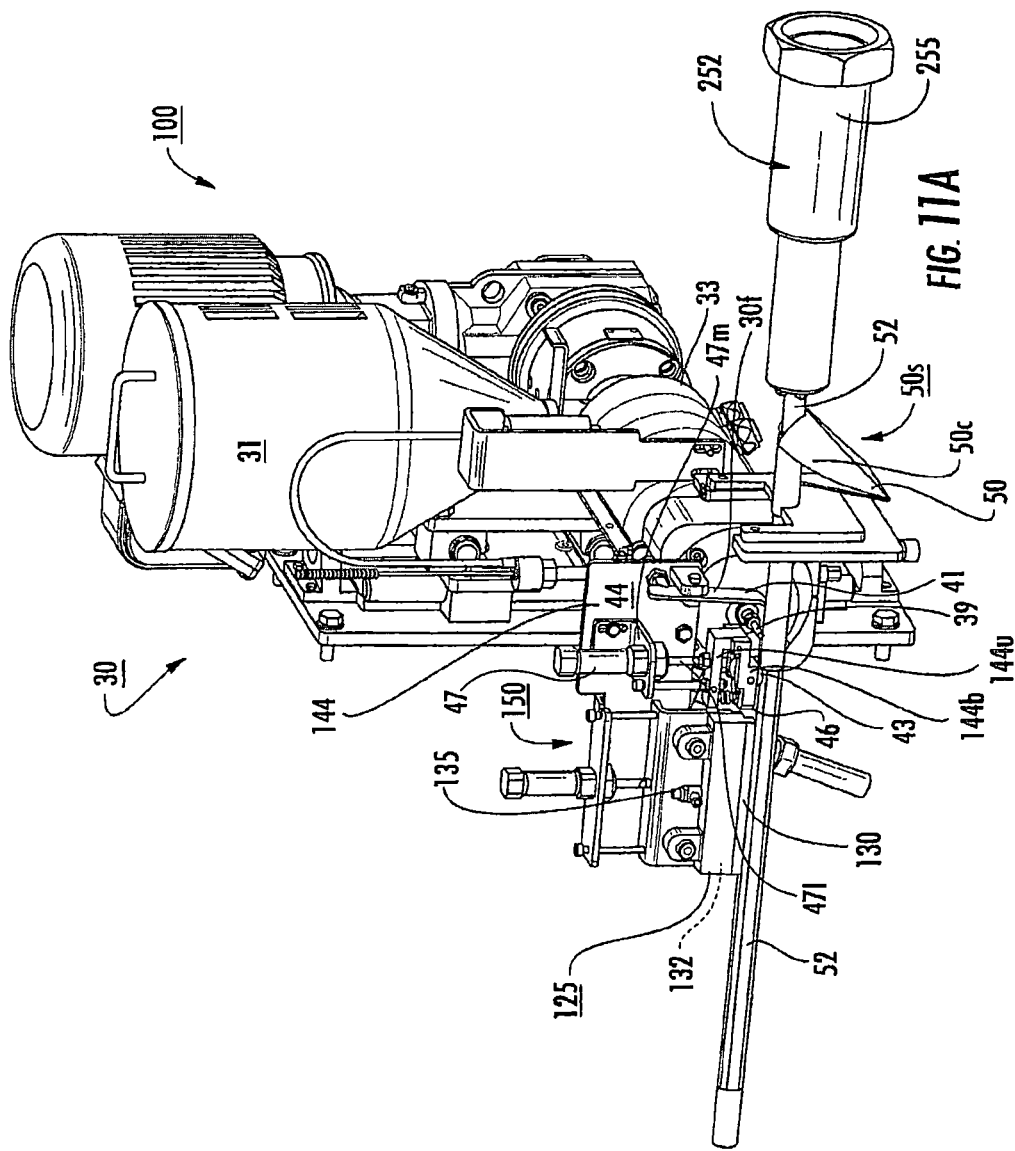
FIG. 11A is a side (isometric) perspective view of a heat-seal module of the packaging system with the horn assembly according to embodiments of the present invention.
Figure 11B:
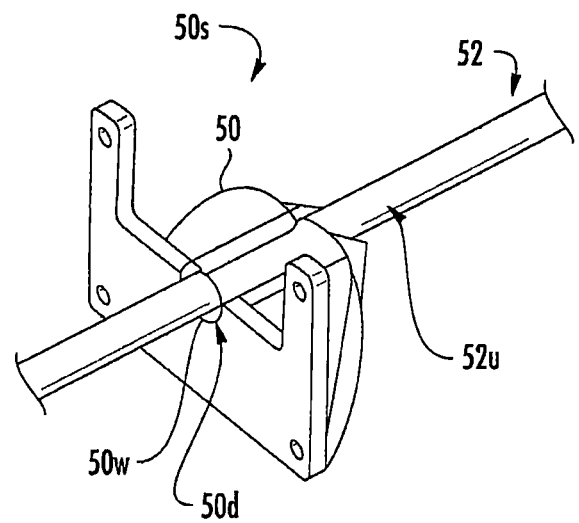
FIG. 11B is a side (isometric) perspective view of a forming segment with a forming collar associated with the heat-seal module shown in FIG. 11A according to embodiments of the present invention.
Figure 11C:
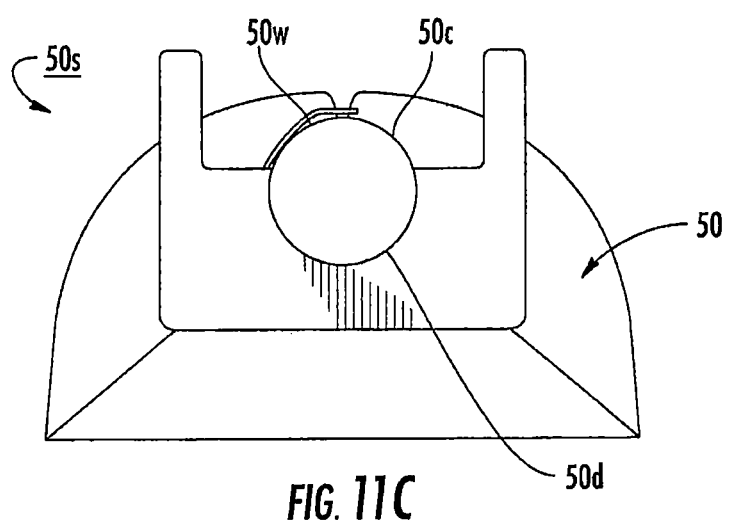
FIG. 11C is an end view of the forming segment shown in FIG. 11B.

The outer diameter of the upstream segment 52u of the sizing mandrel 52 can be selected to be able to extend through the diameter 50d of the channel 50c leading to the collar 50 in the forming segment 50s of the packaging system 10 (FIGS. 11A, 11B and 11C). The forming segment 50s is the segment that forms flat roll stock into a tubular shape using the forming collar 50 and resides, typically adjacent, upstream of the heat-seal module.

The sizing mandrel 52 can be fabricated/selected using a commercially available pipe (from an ASTM/ANSI/ASME pipe chart) to meet four (4) parameters: (a) a maximum inner diameter (ID), a minimum outer diameter (OD), a suitable strength, and sized to be compatible to extend through the opening in the corresponding former channel 50c (FIGS. 11A-11C). For instance, a 32 mm FP (finish product) horn, with a 0.957 inch ID of schedule 80 pipe has 1.315 inch OD which has enough wall thickness to cut down to the sizing dimension 52s and only 0.048 inch wall thickness in the upstream segment 52u and is sized to be able to (barely) pass through the 32 mm former channel 50c (FIGS. 11B, 11C). The strength of new horn/sizing mandrel 52 is believed to be suitably strong, and can be as strong as the old one at the 0.860 inch OD×0.6375 inch ID. Exemplary former channel 50c diameters to form the associated chub diameters are shown below in Table 2.

TABLE 2

Forming Collar Channel Diameter to Chub Diameter

| Forming collar channel diameter | 25 mm | 26 mm | 29 mm | 32 mm |
|---|---|---|---|---|
| Chub diameter | 27 mm | 29 mm | 32 mm | 35 mm |

Note: with the slight reduction of sizing cross-section of the outer surface 52s (which can have more than four flat surfaces, such as between 4-12 flat surfaces, typically an octagonal shape of eight flat surfaces, in some embodiments, instead of 3 flat surfaces) the forming collar channel 50c can have a diameter that may increase respectively in order to make up the strength loss (wall thickness) on 52u due to the ID increase of the sizing mandrel/horn 52. The diameter of the horn/sizing mandrel 52u that extends through the former channel 50c is smaller than the former channel diameter so that film can pass through a gap formed between the outer wall 50w of the former channel 50c and the outer diameter of the sizing mandrel/horn 52u. The listed nominal forming collar channel diameter in Table 2 can be increased or opened up slightly (i.e., between 1-5%) to allow an increased wall thickness of the sizing mandrel with the increased inside diameter 50d.

Following the same considerations, for a 35 mm diameter sizing mandrel 52, a 1 inch nominal Schedule 40 pipe can be employed. This will provide a 1.049 inch ID and can give an increased flow (about twice as much as the existing one). The 1.315 inch OD can be the outer diameter of the horn/sizing mandrel 52s for the 32 mm FP horn/sizing mandrel. When machining down to the upstream end segment of the sizing mandrel 52u, this outer diameter size can go through a 35 mm former channel 50c (FIGS. 11A-11C) and provide suitable strength.

The inner diameter 53 of the wall 52w can be constant and the outer diameter of the wall 52w can be substantially constant over the length of the sizing mandrel (excluding the small segment associated with the horn assembly interface with the collar(s) 352).

The downstream end segment 52d of the sizing mandrel 52 typically has wall with a constant outer diameter that is devoid of or has a lesser number of the flat spaces than the second segment of the sizing mandrel 52s with the plurality of flat spaces 52f. The downstream end segment 52d is shorter than the segment 52s, typically at least 50% shorter in length, and can have a length that is between 2-2.375 inches.

The sizing mandrel 52 can have a second segment 52s with a length Ls having longitudinally extending, radially spaced apart flat outer surfaces 52f. The second segment 52s can reside between the first downstream end segment 52d and a third (upstream) segment 52u both of the first and third segments are typically circular, with a constant outer diameter so as to be devoid of the flat outer surfaces (or have a lesser number of flat outer surfaces). The segment 52s between the downstream end 52d and the upstream segment 52u can have a length Ls that is greater than a length Ld of the downstream end 52d. The length Ld can be between 2-3 inches, typically about 2.375 inches.

Figures 6, 7A, 7B:
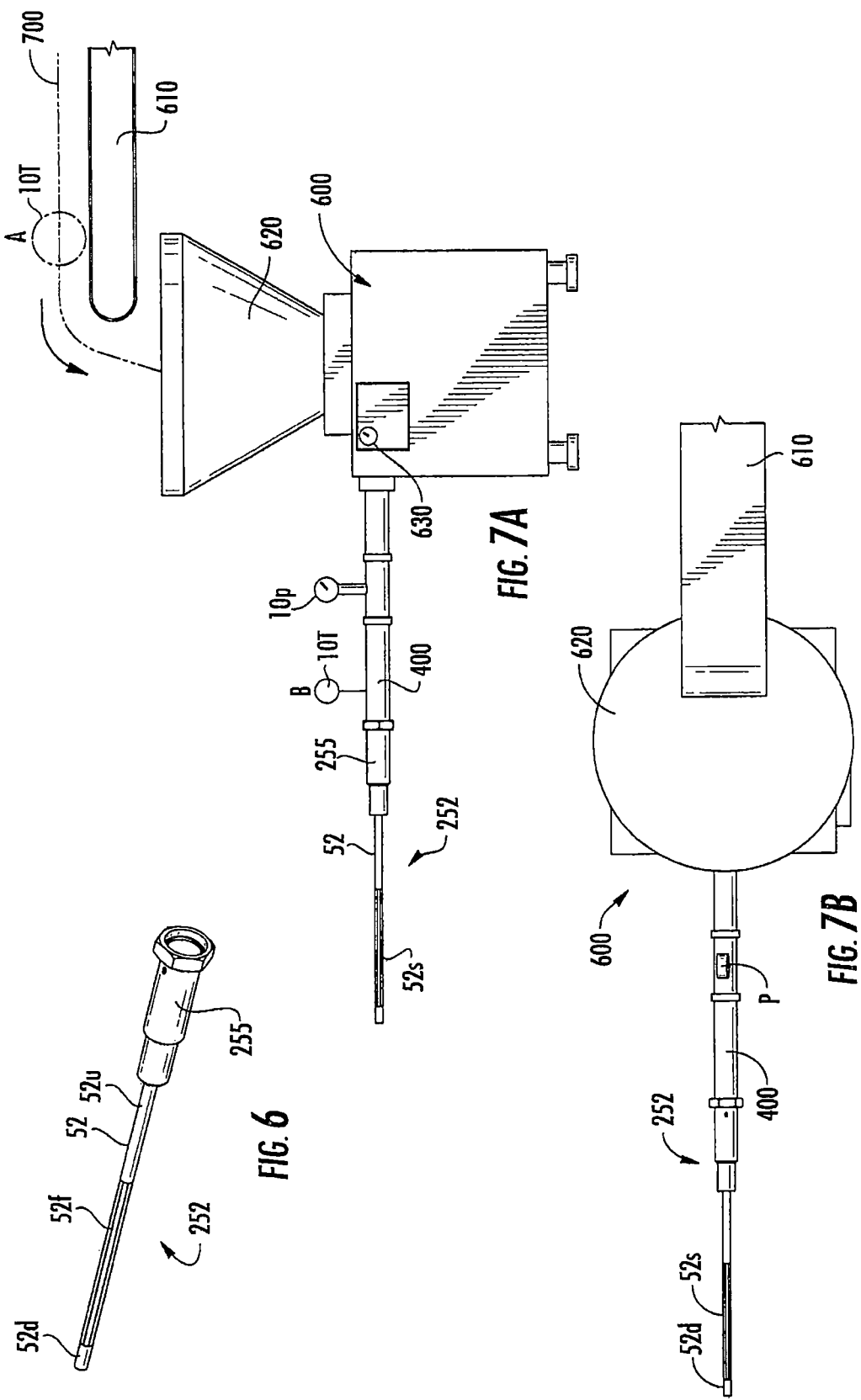
FIG. 6 is a side (isometric) perspective view of a horn assembly according to embodiments of the present invention.
FIG. 7A is a schematic of a front view of a packaging system with a sizing mandrel (which can be interchangeably also referred to as a "filling horn" or "product horn") and illustrating a pressure measurement gauge of the packaging system when cooperating with a stuffer or emulsion supply pump system according to embodiments of the present invention.
FIG. 7B is a top view of the system shown in FIG. 7A.

The length Ls can be greater, the same or less than a length Lu of the upstream segment Lu. FIGS. 6, 13A and 13B show the sizing mandrel 52 as part of a horn assembly 252 with the length Ls greater than length Lu, typically by 30-100% (i.e., for a length Lu of about 11.6 inches, Ls can be between 14-23 inches, typically about 19 inches).

Figure 4:
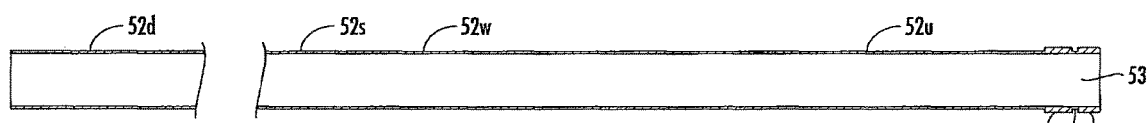
FIG. 4 is a section view taken along line 4-4 in FIG. 3.

Referring to FIGS. 3, 4, 6, 7A and 7B, the sizing mandrel 52 can have a collar interface 352 that attaches to a horn assembly end member 255. As shown in FIGS. 3 and 4 the collar interface 352 can have first and second longitudinally spaced apart collars $352_1$, $352_2$ that are separated by a groove 352g.

Figure 5A:
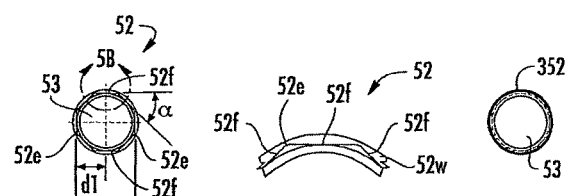
FIG. 5A is an end view of the sizing mandrel shown in FIG. 3.
Figure 5B:
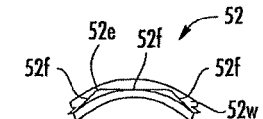
FIG. 5B is an enlarged partial view of the sizing mandrel at detail 5B shown in FIG. 5A according to embodiments of the present invention.
Figure 5C:
FIG. 5C is an opposing end view of the end view shown in FIG. 5A.

Referring to FIGS. 3, 5A and 5B, the segment 52s of the sizing mandrel 52 with the flat outer surfaces 52f can be configured as chamfer segments each having a flat surface extending at an angle $\alpha$, that is less than 90 degrees, such as between about 30-60 degrees, typically about 45 degrees, measured from horizontal along a virtual line drawn off a flat surface 52f and/or measured from an intersection of two virtual lines drawn from adjacent flat surfaces. The flat outer surfaces 52f can be configured as a repeating symmetrical series of between 8-12, typically 8 (eight) flat surfaces extending circumferentially about the perimeter of the segment 52f. Adjacent, neighboring flat surfaces 52f can share a chamfered edge 52e and/or vertex (i.e., peak or apex) as shown in FIG. 5B, for example. In some embodiments, sizing mandrel 52 can have an outer wall with an octagonal geometry that can accommodate sizing control while providing a universal orientation to concurrently cooperate with the vacuum belt 221 of the film drive 40, adhesive nozzle 39 and pressure roller 43 allowing the sizing mandrel to attach to the horn assembly in a plurality of different circumferentially oriented but functional positions.

Still referring to FIG. 5B, in some embodiments, the flat surfaces 52f can have a width (circumferentially extending width) that is between 0.2 inches and 0.5 inches, such as 0.2 inches, 0.225 inches, 0.25 inches, 0.275 inches, 0.3 inches, 0.325 inches, 0.35 inches, 0.375 inches, 0.4 inches, 0.425 inches, 0.435 inches, and 0.45 inches, in some embodiments. The widths of the flat surfaces 52f can vary between different sized sizing mandrels.

In some embodiments, the edges or chamfers of a respective flat surface 52f can reside at a diameter that is between 1.1 inches and 1.25 inches, more typically between about 1.120 and 1.130 inches. However, this is by way of example only and the edges or chamfers of the flat surfaces 52f can reside at different diameters. Moreover, different size sizing mandrels 52 can position the edges or chamfers 52e at different positions, i.e., greater diameters for larger size sizing mandrels relative to smaller size mandrels.

Referring to FIG. 5A, in the orientation shown, a line drawn perpendicularly through a centerline of the sizing mandrel 52 can bisect upper and lower flat surfaces 52f. The line can reside laterally at a distance $d_1$ that is between 0.530 and 0.520, in some embodiments, from an outer chamfer, peak, vertex and/or edge 52e of other flat surfaces. Diametrically opposing flat surfaces can reside a distance $d_2$ away from each other. The distance $d_2$ can be greater than one inch, typically between 1 inch and 1.25 inches, and in some embodiments can reside between 1.045 and 1.055 inches, average, which can also be the outer diameter of the wall 52w over the entire length of the sizing mandrel 52 and/or at both the upstream 52u and/or downstream 52d locations of the sizing mandrel adjacent the segment 52s with the flat surfaces 52f.

In operation, two of the flat surfaces 52f can reside against respective film drives 40 (FIGS. 8, 10) on opposing sides of the sizing mandrel 52 with casing extending therebetween. A third one of the flat surfaces 52f can reside against a roller 43 (FIG. 11A) that can be used to press against overlying edge portions of casing to help form the seal. The sizing mandrel 52 can be rotated periodically to use different sets of the flat surfaces 52f (i.e., orient different flat surfaces to operational components) to avoid wear associated with continual contact with the components and/or prolong the useful life of the sizing horn.

FIG. 6 and FIGS. 13A and 13B illustrate examples of a horn assembly 252. The horn assembly end member 255 has an upstream end 255u with a larger diameter than the downstream end 255d. The upstream end 255u attaches to a pipe 500 (FIG. 7A, 7B) with a larger diameter than the sizing mandrel 52. The collars $352_1$, $352_2$ can reside inside the downstream end 255d of the horn assembly end member 255.

FIGS. 7A and 7B illustrate that the horn assembly 252 is attached to a length of pipe 400 extending from a pump module 600 that supplies the emulsion or other material for packaging. The pump module can comprise a stuffer type pump or another type of pump. The term "stuffer" refers to a pump-based system that can direct viscous material to flow through the pipe 400 and the sizing mandrel 52. A conveyor 610 over a hopper 620 can provide the sensitized emulsion, such as explosives emulsion comprising ammonium nitrate, as the input to the pipe 400. The pump module 600 can include a continuous pump such as a progressive positive or progressive cavity pump and can have a pressure gauge 630. As is known to those of skill in the art progressing cavity pumps apply low shear on the product and are suitable for high viscosity of the explosive liquid/emulsion.

Emulsion explosives can be made by a high shear process from a super-saturated oxidizer solution (ammonium nitrate) plus an oil phase with a surfactant to help the emulsification. The decomposition can start at temperatures as low as 170° C. Emulsion explosive has a non-Newtonian flow property and can vary in their consistency, such as viscous materials between molasses and thick grease. The typically pumping temperatures range from 30 degrees C.-90 degrees C. An example of a commercial grade pump is the Allweiler branded pumps which can meet the necessary hazard operation reviews required. See, Allweiler.com.

The packaging system 10 (FIG. 8) can have a separate pressure gauge 10p that can be used to measure pressure associated with the transfer of the emulsion 700 into the sizing mandrel 52. The packaging system pressure gauge 10p can reside upstream of the horn assembly 252 and downstream of the stuffer 600, typically in fluid communication with a length of the pipe 400. The system 10 can be configured so that the maximum pressure during operation is 11 bars. An automatic shut down or reduced pump speed can occur if pressure is above the defined maximum.

Explosives emulsions are well known to those of skill in the art. However, by way of example only, U.S. Patent Application Publication 2012/0180915 describes some examples of materials comprising ammonium nitrate, the contents of which are hereby incorporated by reference as if recited in full herein.

In some embodiments, the maximum pressure allowed for the system 10, as measured upstream of the sizing mandrel 52 and downstream of the stuffer 600, is typically controlled to be below 11 bars, such as between about 4-10 bars, such as 4 bars, 4.5 bars, 5 bars, 5.5 bars, 6 bars, 6.5 bars, 7 bars, 7.5 bars, 8 bars, 8.5 bars, 9 bars, 9.5 bars, and 10 bars.

The packaging system 10 and pumping module 600 can cooperate to package over 250 ppm, typically over 275 ppm, such as at or over 300 ppm and/or between 300-350 ppm of between 200 g to 300 g tubular shaped encased packaged product with clipped end portions.

Product viscosity along with temperature can influence the production rate and pressure, for example. Different size sizing mandrels can operate at different production rates. In some embodiments, the packaging machine 10 can operate at 3.6 tons/hour to produce 200 g in 32 mm diameter product (under maximum pressure). In some embodiments, for a 35 mm diameter product, the packaging system 10 can operate to handle flow at up to 4.5 tons/hour.

The packaging system 10 can be particularly suitable for packaging explosives emulsion at lower temperatures and higher speeds than in the past. For example, in the past, Rota-Clip® packaging systems could package high temperature emulsions (85 degrees C. to 95 degrees C.) at pressures of about 6 bars and 300 ppm. However, lower temperature explosives emulsions can create undesirable pressures at higher speeds (speeds above about 250 ppm, such as at 300 ppm) slowing production speed. The new horn assembly 252 can allow faster production at lower pressures suitable for mid temperature (at or below 65 degrees C. to above 50 degrees C.) and/or low temperature explosives emulsions. Low temperature explosive emulsions refer to emulsions at temperatures between 50 degrees C. to 55 degrees C. as introduced into the pump module 600 and/or into the sizing mandrel 52.

The temperature of the emulsion can be measured in various locations typically using a temperature gage 10T (FIG. 7A), typically at one or both of location A and B. The location for the temperature gage 10T may vary based on pump type and emulsion type, i.e., cold temperature and medium temperature emulsion (which may reside at location A, adjacent an end of the conveyor 610) or hot temperature emulsion (which can reside at location B).

In some embodiments, such as for facilities that employ a stuffer type pump 600 such as shown in FIGS. 7A/7B, the temperature gage 10T can be at a location A, upstream of the emulsion entry into the hopper 620 in communication with the conveyor 610. For systems 10 with pump modules 600 which employ a more enclosed system/style, such as an in-line progressive pump, the temperature gage 10T can be mounted at position B (Figure 7A), i.e., to the pipe segment 400 between the pump 600 and the inlet of the sizing mandrel 52 of the packaging system 10.

The explosive emulsions can be for a 200 g to 300 g unitized packaged product having about a 32 mm outer diameter or a 35 mm outer diameter. The packaging system 10 can be configured to provide clipped packages at a rate of greater than 3 tons/hour.

Figure 8:
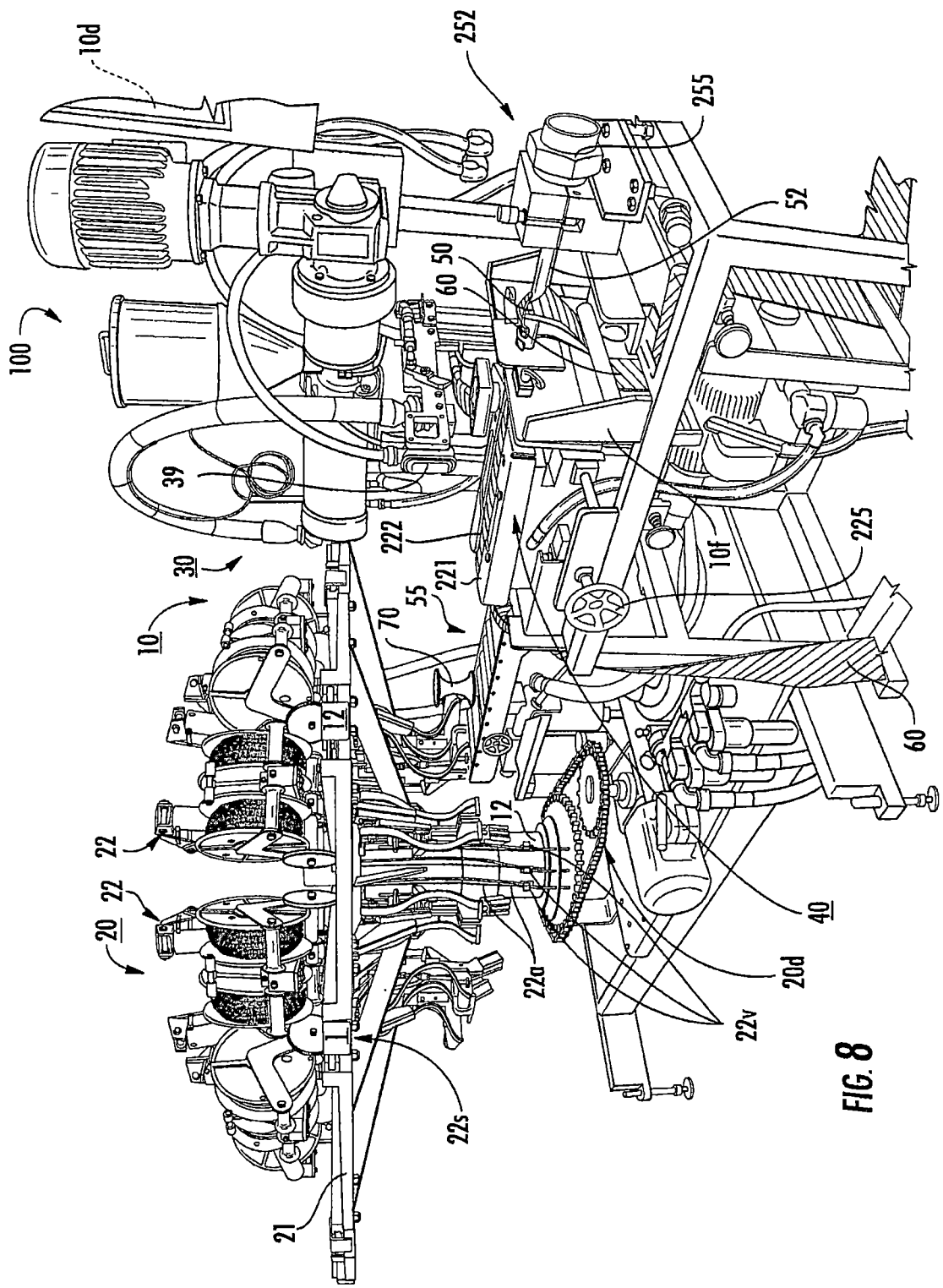
FIG. 8 is a side (isometric) perspective view of a portion of the packaging system that can cooperate with the sizing mandrel according to embodiments of the present invention.

FIG. 8 illustrates an exemplary packaging system 10 with a rotating platform or table 20 holding multiple clippers 22 and a heat-seal module 100 residing upstream of the table 20. The heat seal module can include a dispenser 39 that is in cooperating alignment with the sizing mandrel 52. The clippers 22 do not all need to be operational during a packaging operation (e.g., alternating ones can be deactivated), or the table 20 may include other numbers of clippers 22, typically between 10-14. Rota-Clip® packaging systems are available from Tipper Tie, Apex, N. C. As shown, the rotating platform or table 20 can have a table top 21 with circumferentially spaced apart clippers 22 (typically double clippers). The number of clippers 22 used in combination with the circumference of the table 20, and/or the radially adjusted position of the clippers 22 on the table 20 can allow for different lengths of end product to be produced. For example, for the same clipper radial positions, one operation using all 12 (twelve) clippers 22 can produce a six-inch product and if every other clipper 22 is deactivated, up to a 36 inch product can be used. Larger sizes can be achieved using alternate configurations.

Figure 10:
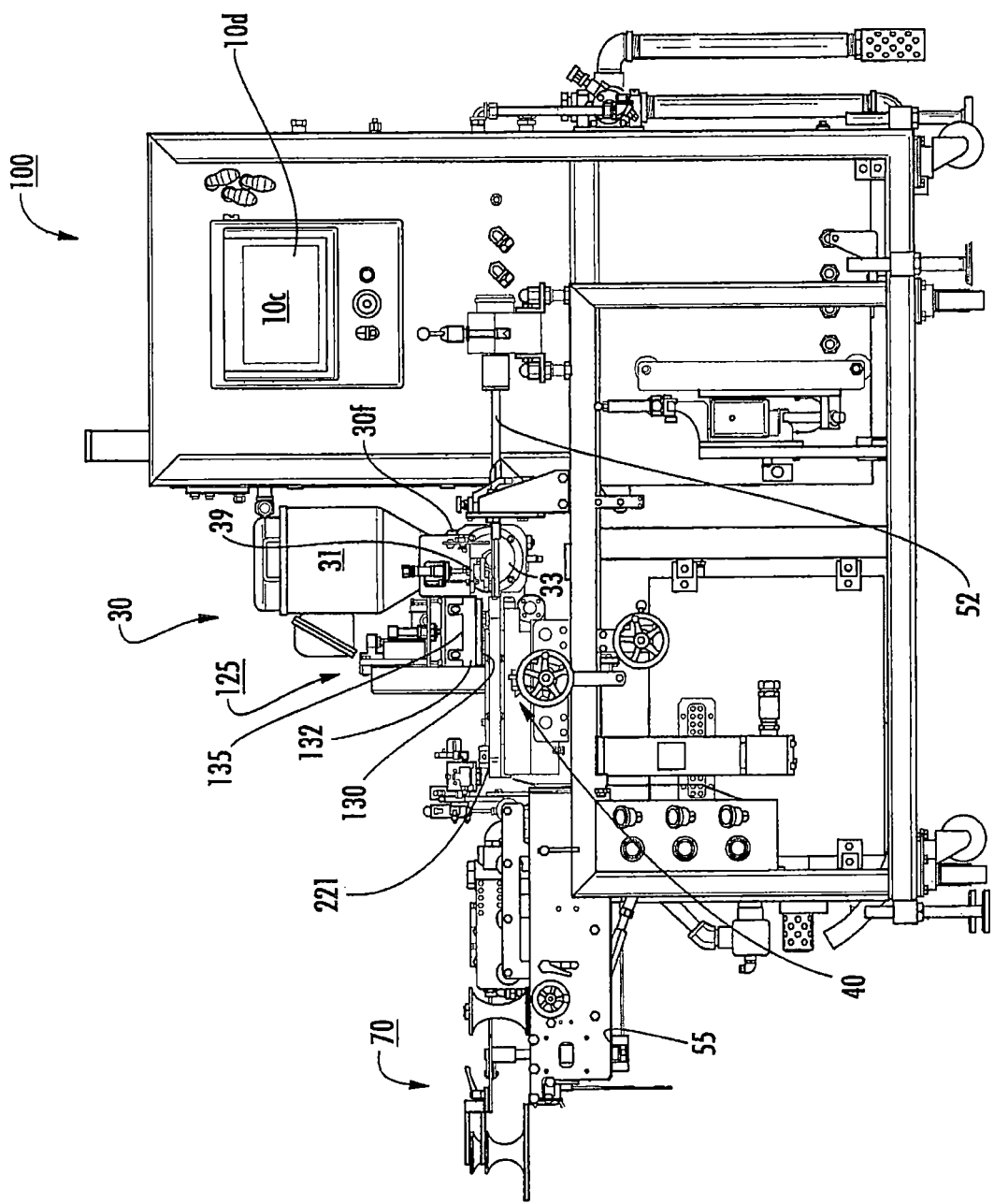
FIG. 10 is a front view of a part of the packaging system holding the horn assembly with a sizing handle according to embodiments of the present invention.

As shown in FIG. 8, the packaging system 10 can include miniature ball valves ("trigger valves") 22v, typically one for each clipper 22 in communication with a pneumatic control that automatically controls the activation and deactivation of the respective clipper 22 based on the system (HMI/PLC) controller 10c (FIG. 10). As with conventional rotating platform clippers, in operation, the sealed filled tubular covering is clipped under the platform table surface. The system 10 can be configured a touchscreen input on the HMI (human/machine interface) display 10d. This user-selectable input can tell the rear and front vacuum belts 221, 222 of the film drive assembly 40, to open or close, and can automate various control functions. After the film 60 is in position, the machine/system 10 is ready for operational position, whereby the vacuum belts 221, 222 abut up against the film 60, clamping the film 60 between flats 52f of the sizing mandrel/horn 52 and the belts 221, 222. This can be done pneumatically with air cylinders which are associated with the vacuum belt drives 221, 222. A belt driven by an electric motor can drive both vacuum belts 221, 222. The film drive assembly 40 can have an adjustment wheel 225 which can move both of the vacuum belt drives 221, 222 (together) toward the front or back of the machine. This action allows the front and back vacuum belt drives to be aligned substantially equidistant to the horn 52. Once they are equal in distance from the horn 52, an input on the touchscreen 10d (FIG. 10) can be used to electronically open or close the vacuum drives 221, 222. The opening and closing are typically simultaneous. It is noted that, while vacuum film drives are shown by way of example for moving the film through or past the heat-seal module 100, other film drives may be used.

Referring to FIG. 8, two air lines 22a can run down the center column 12 for each clipper station 22s. One line is the main air line for the trigger valve underneath the sprocket. The second air line allows the clipper gate of the respective clipper 22 to close. It can also have an inline shut off valve 22v installed in the tubing. If this is used, it shuts off the air to the gate cylinder on that individual clipper. If the gate does not close, the clipper will not "fire" (send down the punch or fire the knife). The reason behind turning off a clipper is to run a longer product than the normal length of product (e.g., chub) that each clipper can handle. For example, if clipper #1 is on, clipper #2 is off, and clipper #3 is on, the product length becomes the distance from the #1 clipper to the #3 clipper.

The rotating platform 20 has a vertical support 12 (also described as a column or leg) which is in communication with the main drive system 20d that rotates the platform and clippers at the desired speed (and can automatically vary the speed depending on production requirements/inputs). The air supply lines that connect to the various clippers can travel down the column 12 to an air supply. The system 10 can include a single common main air supply that can be diverted to feed all of the clippers. Alternatively, each or groups of the clippers may have a dedicated discrete air supply. Each clipper 22 can include on-board air supply conduits/lines with valves that releasably connect to the air supply lines on the column 12.

The system 10 can include a Siemens variable frequency drive and integral safety system, including, for example, a Siemens Step7 300 Processor with Integral Safety Systems, including a Siemens touch screen, motor drives and safety modules. The touch screen can include a series of iconic and/or pictorial image display of user-activated or status indicating features for various components, e.g., adhesive nozzle down, pump "on or off" and the like. The electric motors can be explosion-proof TECO motors that can be mounted outside the electrical box to reduce or eliminate cooling issues. The system can include automatic positioning of vacuum belt drives. The system 10 can be Ethernet ready for remote access via VPN and may also be PROFI-BUS ready, foreign language supported.

In some embodiments, the system 10 can be configured to operate with an automated synchronized drive control system that may use a single virtual axis for ramp-up to maximum operational speed that synchronizes the covering (e.g., film) drive, the adhesive extruder drive and the rotating table drive (using the Siemens or a similar variable frequency drive system). Each drive system can operate at a selected (variable or constant) speed. The film and extrusion drive can operate to provide sealed tubular covering at any desired speed, including between about 10-400 feet per minute, typically between about 150-350 feet/min; more typically, the machine can operate at an operating speed of about 300 feet/minute.

As shown in FIGS. 8, 10 and 11A, the heat-seal module 100 can include an adhesive system 30 with an associated (heated) adhesive flow path that provides hot-melt or other heated adhesive to the adhesive dispenser 39, e.g., nozzle or other dispensing member adjacent but downstream of the casing (i.e., film) drive assembly 40. A forming collar 50 can reside over the horn assembly 252 upstream of the film drive assembly 40 (FIG. 8).

The heat-seal module 100 can include a Human Machine Interface (HMI) with a controller 10c and a display 10d for allowing a user to select certain operating parameters and/or review operational status and the like. To be clear, the term "module" when used with respect to the phrase "heat-seal" or "pump" refers to a physical sub-assembly of a packaging system. For example, a heat-seal module seals flat stock for encasing a product, typically the heat-seal module seals the film or other casing material into a tubular shape.

Figure 9:
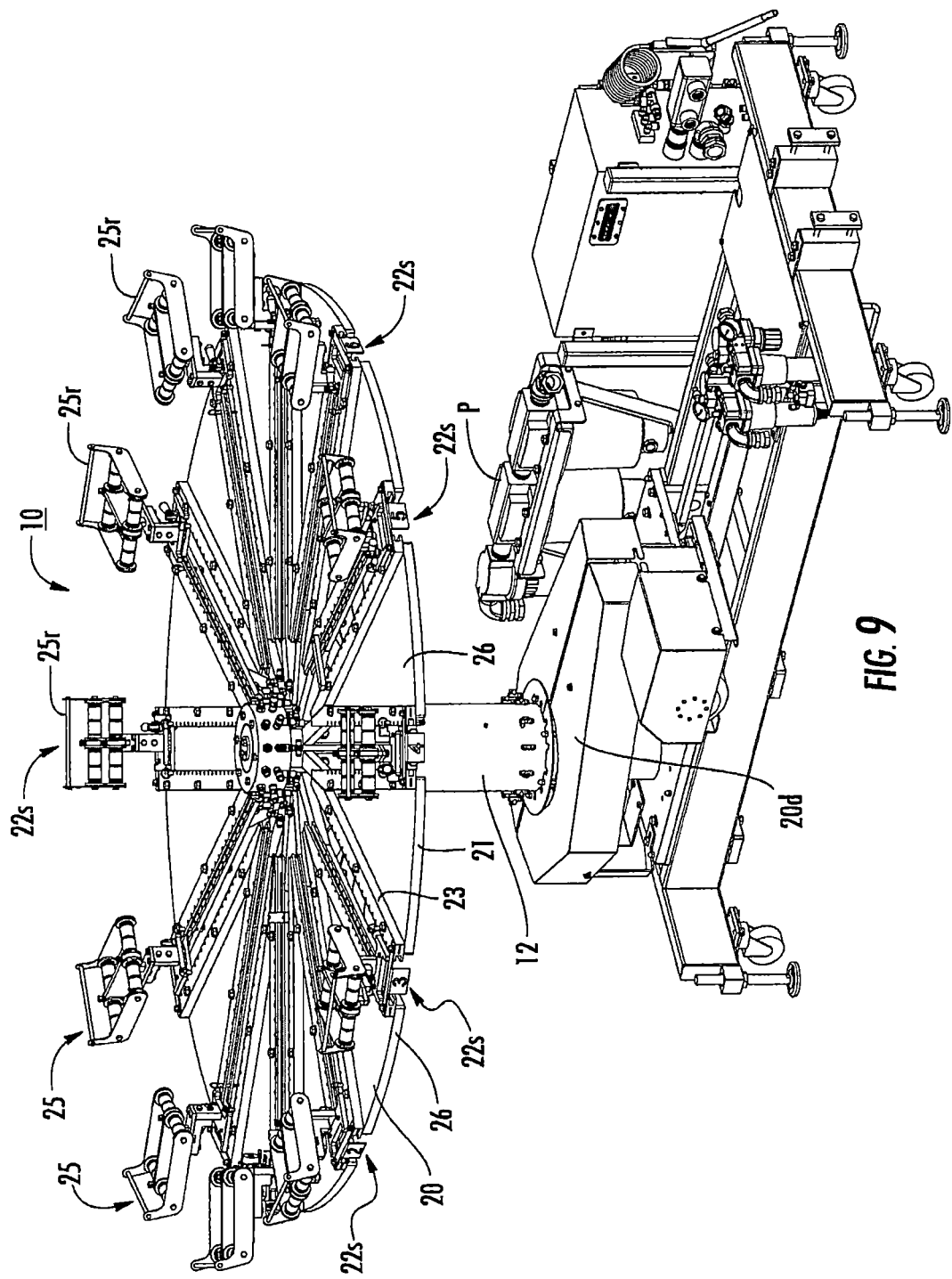
FIG. 9 is a side (isometric) perspective view of the rotating clipper table with alternate clip spool cradle configurations according to embodiments of the present invention.

FIG. 9 illustrates that the rotating table 20 can include clip spool cradles 25 with cross-rods 25r at respective clipper stations 22s. The table 21 can include a series of circumferentially spaced apart wedge or "pie" slice shaped members 26.

As shown in FIGS. 10 and 11A, the packaging system 10 can optionally include a heat-seal cooler 125 that can reside downstream of the film drive assembly 40 and within a distance D of between about 0.1 inches to about 6 inches from the drive belts 221, 222 (FIG. 8). In some embodiments, where used, the heat-seal cooler 125 can reside above the belts 221, 222, in line with the sizing mandrel/horn 52 and a short distance downstream of the adhesive applicator 39 (FIG. 11A), typically positioned to reside within about 0.10 inches to about 6 inches from the applicator 39 more typically between about 0.25 inches and 3 inches.

The heat-seal cooler 125 can include an applicator pad 130 that contacts a formed heat-seal of film 60 as the film travels (is pulled) over the product horn 52. The heat-seal cooler 125 can comprise a reservoir body 132 with at least one cavity that comprises a liquid coolant, e.g., water. The cavity is in fluid communication with the applicator pad 130. The at least one cavity feeds the liquid to the applicator pad 130. The applicator pad 130 has an external exposed surface that contacts the heat-seal seam or area of the film. In use, the applicator pad 130 can contact the film and wipe liquid onto the heat-seal 62. The contact can apply a thin layer of liquid to avoid dripping the liquid from the applicator pad onto the floor under the applicator pad 130 or onto the film drive 40 or motor(s) thereof. Thus, the heat-seal cooler 125 is not required to be configured as a closed loop circulating coolant system.

In some embodiments, the liquid (e.g., water) reservoir body 132 is in fluid communication with a meter-in valve 135 and a supply flow line to a liquid supply/liquid source. The applicator pad 130 can comprise a wicking or wetting material such as felt and/or a sponge material as described further below. Thus, the (coolant) liquid for the heat-seal can wick, migrate or flow through the applicator material which rests on/against the film. The heat-seal cooler 125 can dispense, wipe or lay down a thin layer of liquid (e.g., water) on top of the seam as the film travels past the heat-seal cooler 125 and the thin layer of liquid is carried away from the heat-seal (e.g., glue seal) module 100 and may be evaporated by the time the film reaches a clipper or other closure device. In some embodiments, the liquid-cooled heat-seal travels toward one or more clippers 22 (FIG. 8). The contact-cooler 125 can be configured so that no water drips around or near the film drive system 40, e.g., the film drive motors and/or vacuum belts.

Where used, the heat-seal cooler 125 can be attached to a frame 10*f* of the heat-seal module or other support member of the packaging system, using a mounting assembly 150. The mounting assembly 150 and associated components (heat-seal cooler 125) can be provided as a retrofit kit as well as incorporated as features of OEM heat-module systems. As noted above, the heat-seal cooler 125 is optional and, where used may have other configurations or be provided by other type coolers.

In the exemplary embodiment shown in FIGS. 10, 11A the adhesive flow path 30*f* associated with the (horizontal) extruder 33 to the adhesive applicator 39. The extruder 33 can be stationary and horizontally oriented in fluid communication with a hopper 31. The adhesive applicator 39 can be configured to emit a plurality of strips of adhesive onto the surface of the film/covering, typically three strips.

In some embodiments, as shown in FIGS. 10 and 11A, the adhesive system 30 can include a hopper 31 positioned above a horizontal extruder 33 with a flow path 30*f* that extends to the applicator 39. The horizontally extending extruder 33 can be oriented to extend perpendicular to the horn 52 as shown. A lifter 41 may be positioned upstream and adjacent to the applicator 39 (e.g., dispensing nozzle).

As shown in FIGS. 10 and 11A, the system 10 can include a heat seal module 100 with a vertically oriented hopper 31 that holds bulk adhesive material, typically in solid pellet, crystal or granule form. The adhesive pellets can comprise a polymer such as, for example, HDPE. The hopper 31 feeds the raw material to a horizontally extending screw extruder 33 that includes a barrel in communication with a screw auger. As shown, the extruder 33 is stationary and fixed in position. The barrel includes at least one heater, typically two internal heaters, to melt the pellets or other source adhesive material into a flowable form. A suitable commercially available extruder is a ¾ inch screw extruder from Killion Extruders, located in Cedar Grove, N. J. A keyway or groove can be bored or formed into the inner diameter of the extruder feed section (at about "6:00 o'clock" opposite the infeed of the hopper) to promote flowability of the pellets into the extruder 33 without over driving the motor. Further details of a packaging system and en exemplary hot-melt seal system can be bound in U.S. Pat. No. 8,006,463, the contents of which are hereby incorporated by reference as if recited in full herein.

The heat-seal can be performed using a hot-melt flowable material, such as a polymer, as the adhesive that seals two layers together to form a seam that connects the two long edges/edge portions to form a tubular body from flat roll stock. The seaming can use additional and/or other suitable sealing means, including, for example, a heat-seal band, ultrasonic, light (ultraviolet or other desired wavelength), chemical, mechanical and/or other sealing means. The seam can be a flat seam, a fin seam, or other overlapping and/or abutting joint configuration, but is typically formed with one long edge of the casing overlapping the other. The adhesive can be heated to or above the melt point, typically between about 200-300 degrees Celsius to promote the flow of the adhesive. The adhesive can be discharged from the adhesive applicator 30 onto to the film at a temperature that is between about 200-300 degrees Celsius (degrees C.), typically between 200-259 degrees C.

As shown in FIG. 11A, for example, in some embodiments the roller 43 can be provided using a roller module 44 with a downwardly extending roller 43, typically a spring-loaded roller 43, can be positioned adjacent the dispenser 39, downstream thereof, to press against the seam after the adhesive has been applied. Typically, as shown, the roller 43 is positioned before the heat-seal cooler 125, e.g., between the dispensing nozzle 39 and the heat seal cooler 125, such as 0.25—two inches from the dispenser 39 and between 0.25 inches and three inches of the closest end of the pad 130. The roller 43 can apply pressure to the seam immediately after the adhesive (glue) is applied to facilitate a strong, flat seal. The roller module 44 can include a fluid (typically pneumatic) cylinder 47 with an actuator leg 47*l* to move it into operative position. The roller module 44 can include at least one downwardly extending spring 46 that can reside downstream of the roller 43 and that can apply a force unrelated to the air pressure force, typically a force smaller than the force applied by the cylinder 47.

The roller module 44 can include first and second bracket members 144*b*, 144*u* with the actuator leg 47*l* attached to the second member 144*u* and with roller 43 attached only to the first member 144*b*, under the actuator leg 47*l*. The roller module 44 (i.e., roller assembly) can have a mounting assembly 144 that can include first, second and third brackets 144*b*, 144*u*, 47*m*. The lower or first bracket 144*b* can hold the roller 43. A coil spring 46 can be held between the first and second bracket members 144*b*, 144*u*, adjacent the roller 43. The upper or third bracket member 47*m* can reside above the first and second bracket members 144*b*, 144*u*. A rod 247 can be attached to the second and third bracket members 144*u*, 47*m*, and extend parallel to the actuator leg 47*l*. The lower or first bracket member 144*b* can hold the roller 43 to be closely spaced apart above the sizing mandrel/product horn 52.

Although particularly suitable for low and mid temperature explosive emulsions, the systems can be used for high-temperature explosive emulsions that can be in tubular packages and/or other products such as elongated food, such as a meat product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in film or other casing materials. Examples of other products include powders such as granular materials including grain, sugar, sand, explosives (high, medium and/or low temperature) and the like or other flowable materials including wet pet food (similar to that held conventionally in cans) or other powder, granular, solid, semi-solid or gelatinous materials.

The product may be a packaged in any suitable industry including food, aquaculture, agriculture, environment, chemical, explosives, or other applications.

FIG. 10 illustrates that the packaging system 10 can comprise tension feedback members 70 that communicate with the filled tensioned casing/product. One member can be configured to translate outwardly from a pivoting arm in response to excess tension, which exerts force against the respective member, causing the film speed, the adhesive extrusion speed, and/or adhesion delivery to increase. In operation, the downstream member of the members 70 is configured to communicate with a position sensor to provide the feedback to the controller to allow the controller to adjust the operational parameters.

Comparing a prior art horn assembly 252 for a 29 mm sizing mandrel (for a 32 mm end product) as shown in FIGS. 12A and 12B with a new horn assembly 252 for the same size, the overall length of each horn assembly $L_H$ can be the same allowing for serial, interchangeable use on a respective packaging system 10. The length $L_H$ can be about 42.374 inches, in some embodiments. However, the new horn assembly 252 can have a shorter sizing mandrel 52 and a longer horn assembly end member 255 relative to the conventional horn assembly. The new horn assembly end member 255 can have a length Li that is between 10 and 15 inches, typically about 12.84 inches. The horn assembly end member 255 can have a first length with a constant internal diameter that merges into a funnel segment that tapers 255t down to the inner diameter of the sizing mandrel adjacently upstream of the collar interface 352.

In some embodiments, as shown in FIGS. 13A and 13B, the horn assembly end member can include first and second segments $255s_1$, $255s_2$ and each can have an inner wall that tapers down to a smaller inner diameter in the direction of the sizing mandrel 52. The first segment $255s_1$ can have a constant inner diameter over a major portion of its length, typically for between 4-8 inches, before tapering down in size for a shorter length, typically between 1-3 inches, to a diameter that is the same as the diameter at the entry of the second segment $255s_2$.

Figure 14:
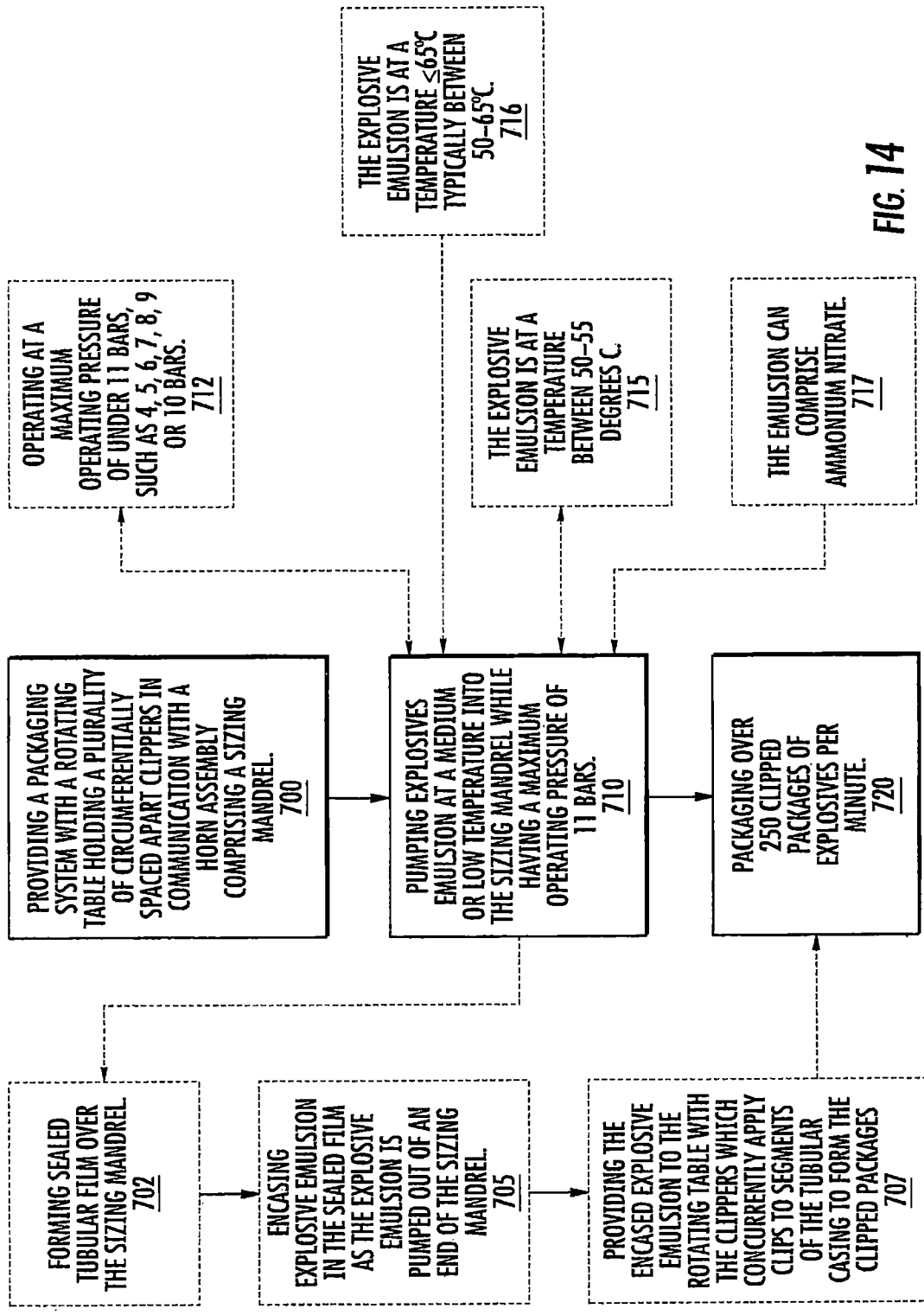
FIG. 14 is a flow chart of exemplary actions that can be carried out to package explosive emulsion at temperatures under 65 degrees C., typically between 65 degrees C. and 50 degrees C., such as at or under 60 degrees C. such as between 50-55 degrees C., according to embodiments of the present invention.

FIG. 14 illustrates exemplary actions that can be carried out to perform methods according to embodiments of the present invention. A packaging system with a rotating table holding a plurality of circumferentially spaced apart clippers in communication with a horn assembly comprising a sizing mandrel is provided (block 700). Explosives emulsion can be pumped (i.e., stuffed) while at a low temperature into the sizing mandrel while having a maximum operating pressure of 11 bars (block 710). Over 200 (typically 250 or more such as 250-350) clipped packages of explosives can be packaged, in tubular casings, per minute (block 720). This rapid production of the clipped tubular packages of the encased pumped emulsion per minute can be continuous over a labor shift of 4-8 hours or longer to thereby have rapid packaging operations without requiring shutdown for overpressure conditions.

The methods can include forming sealed tubular film over the sizing mandrel (block 702); encasing explosive emulsion in the sealed film as the explosive emulsion is pumped out of an end of the sizing mandrel (block 705) and providing the encased explosive emulsion to the rotating table with the clippers which concurrently apply clips to segments of the tubular casing to form the clipped packages (block 707) to carry out the packaging of the clipped packages of explosive emulsion per block 720.

The packaging can be carried out while there is a maximum operating pressure of under 11 bars, such as at 4, 5, 6, 7, 8, 9 or 10 bars, measured between the sizing mandrel and the stuffer/pump module (block 712).

The explosive emulsion can be introduced into one or more of the stuffer, sizing mandrel or pipe between the stuffer/mandrel at a temperature between 50-55 degrees C. (block 715).

The explosive emulsion can be introduced into one or more of the stuffer, sizing mandrel or pipe between the stuffer/mandrel at a temperature at or below 65 degrees C., typically between 50-65 degrees C. (block 716).

The emulsion can comprise ammonium nitrate (block 717).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A horn assembly for a packaging system for packaging flowable content into a casing formed from flat casing material by the packaging system with the use of the horn assembly, comprising:
a tubular sizing mandrel constructed from ASTM standard schedule pipe having a longitudinal central axis and a downstream end segment with a smooth, diametrically curved outer surface devoid of flat surfaces, the downstream end segment merging into an integral, adjacent intermediate segment with at least 8 circumferentially spaced apart, longitudinally extending flat outer surfaces forming the entire exterior surface of the intermediate segment, with the flat surfaces bounded laterally by a shared vertex or chamfered edges that correspond to the outer diameter of the mandrel intermediate segment, whereby the flat surfaces are a radial distance from the longitudinal central axis of the mandrel less than the outer diameter of the mandrel intermediate segment;
wherein the flat surfaces have a width of between 0.3 and 0.5 inches;
wherein one of the flat surfaces is configured to define a sealing surface for supporting the longitudinal seam being formed by overlapping the edges of the flat casing material and applying an adhesive to the overlapping edges and then pressing the overlapping edges against the sealing surface with a roller;
wherein other of the flat outer surfaces are disposed in sets that are diametrically opposed to each other and are configured to provide drive surfaces of a width to receive drive belts that press against the formed casing and cause the casing to slide along the diametrically opposed drive surfaces;

wherein any of the flat outer surfaces can serve as the sealing surface and other of the flat surfaces are arranged in pairs that are diametrically opposed to each other and transverse to the sealing surface to serve as the drive surfaces;

the intermediate section merging into an upstream end segment with a smooth, diametrically curved outer surface devoid of flat surfaces; and wherein the interior of the sizing mandrel is of constant diameter along the entire length of the sizing mandrel.

2. The horn assembly of claim 1, wherein there are eight flat outer surfaces, with all adjacent flat surfaces sharing a respective longitudinally extending vertex or chamfered edge.

3. The horn assembly of claim 1, wherein at least some of the flat outer surfaces have a length of between 19-21 inches.

4. The horn assembly of claim 1, wherein the intermediate segment of the sizing mandrel has a length that is between 19-21 inches, and wherein the downstream end segment has a length that is between 2-2.5 inches.

5. The horn assembly of claim 1, wherein the sizing mandrel has a constant wall thickness over a length associated with the flat outer surfaces of the intermediate segment as well as adjacent upstream and downstream segments thereof.

6. The horn assembly of claim 1, wherein the sizing mandrel has an inner diameter over its length of between 0.90 inch and 1.10 inch, and wherein there are at least 8 circumferentially spaced apart, longitudinally extending flat outer surfaces of the intermediate segment.

7. The horn assembly of claim 1, further comprising a horn assembly end member attachable to the upstream end segment of the tubular sizing mandrel.

8. The horn assembly of claim 7, wherein the horn assembly end member comprises a first tubular segment that merges into a smaller second tubular segment, both the first and second tubular segments having outer diameters that are larger than the sizing mandrel, wherein the horn assembly end member comprises an interior flow channel that is in fluid communication with the sizing mandrel, wherein the horn assembly end member is configured to attach to a pipe segment that resides upstream of the horn assembly with an outer diameter of between 3 inches to 4 inches.

9. A tubular sizing mandrel for a horn assembly for a packaging system for packaging flowable content into a casing formed from flat casing material by the packaging system with the use of the mandrel, comprising:

the mandrel constructed from ASTM standard schedule pipe having a longitudinal central axis and a downstream end segment with a smooth, diametrically curved outer surface, the downstream end segment merging into an integral, adjacent intermediate segment with an even at least 8 circumferentially spaced apart, longitudinally extending flat outer surfaces forming the entire exterior surface of the intermediate segment, with the flat surfaces bounded laterally by a shared vertex or chamfered edges that correspond to the outer diameter of the mandrel intermediate segment, whereby the flat surfaces are a radial distance from the longitudinal central axis of the mandrel less than the radial distance from the longitudinal central axis to the outer diameter of the mandrel intermediate segment;

wherein the flat outer surfaces have a width of between 0.3 and 0.5 inches;

wherein one of the flat outer surfaces is configured to define a sealing surface for supporting the longitudinal seam being formed by overlapping the edges of the flat casing material and applying an adhesive to the overlapping edges and then pressing the overlapping edges against the sealing surface with a roller;

wherein other of the flat outer surfaces are disposed in sets that are diametrically opposed to each other and are configured to serve as drive surfaces sized to receive drive belts that press against the formed casing and cause the casing to slide along the diametrically opposed drive surfaces;

wherein any of the flat outer surfaces can serve as the sealing surface and others of the flat surfaces are arranged in pairs that are diametrically opposed to each other and transverse to the sealing surface to serve as the drive surfaces;

wherein the intermediate segment merging into an upstream end segment with a smooth, diametrically curved outer surface; and wherein the interior of the sizing mandrel is of constant diameter along the entire length of the sizing mandrel.

10. The tubular sizing mandrel of claim 9, wherein the number of flat outer surfaces are selected from the group consisting of 8, 10, and 12.

11. The tubular sizing mandrel of claim 9, wherein at least some of the flat outer surfaces have a length of between 19-21 inches.

12. The tubular sizing mandrel of claim 9, wherein the intermediate segment of the sizing mandrel has a length that is between 19-21 inches, and wherein the downstream end segment has a length that is between 2-2.5 inches.

13. The tubular sizing mandrel of claim 9, wherein the sizing mandrel has a constant wall thickness over a length associated with the flat outer surfaces of the intermediate segment as well as adjacent upstream and downstream segments thereof.

14. The tubular sizing mandrel of claim 9, wherein the sizing mandrel has an inner diameter over its length of between 0.90 inch and 1.10 inch, and wherein there are at least 8 circumferentially spaced apart, longitudinally extending flat outer surfaces of the intermediate segment.

15. The tubular sizing mandrel of claim 9, further comprising a horn assembly end member attachable to the upstream end segment of the tubular sizing mandrel, wherein the horn assembly end member comprises a first tubular segment that merges into a smaller second tubular segment, both the first and second tubular segments having outer diameters that are larger than the sizing mandrel, wherein the horn assembly end member comprises an interior flow channel that is in fluid communication with the sizing mandrel, wherein the horn assembly end member is configured to attach to a pipe segment that resides upstream of the tubular sizing mandrel.

* * * * *

UNITED STATES PATENT AND TRADEMARK OFFICE
CERTIFICATE OF CORRECTION

PATENT NO. : 10,843,826 B2  
APPLICATION NO. : 15/231015  
DATED : November 24, 2020  
INVENTOR(S) : K. Chen Page 1 of 1

It is certified that error appears in the above-identified patent and that said Letters Patent is hereby corrected as shown below:

In the Claims

| Column | Line | |
|---|---|---|
| 21 | 53 | please delete "an even" before "at" |

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*